(12) United States Patent
Dostaler et al.

(10) Patent No.: US 8,020,825 B2
(45) Date of Patent: Sep. 20, 2011

(54) UTILITY CLIP

(75) Inventors: Mélanie Dostaler, Québec (CA); Guy Lemire, P. Québec (CA)

(73) Assignee: Stryker Corporation, Kalamazoo, MI (US)

(*) Notice: Subject to any disclaimer, the term of this patent is extended or adjusted under 35 U.S.C. 154(b) by 824 days.

(21) Appl. No.: 11/940,844

(22) Filed: Nov. 15, 2007

(65) Prior Publication Data

US 2008/0128571 A1 Jun. 5, 2008

Related U.S. Application Data

(60) Provisional application No. 60/866,206, filed on Nov. 16, 2006.

(51) Int. Cl.
*A47G 1/10* (2006.01)
(52) U.S. Cl. .............. 248/316.7; 248/74.4; 248/229.13; 24/332
(58) Field of Classification Search .............. 248/316.7, 248/74.4, 229.1, 229.13, 229.16, 230.7, 231.81, 248/313, 316.1, 316.5, 103; 24/332, DIG. 22
See application file for complete search history.

(56) References Cited

U.S. PATENT DOCUMENTS

| | | | | | |
|---|---|---|---|---|---|
| 2,218,311 | A | * | 10/1940 | Elliott | 248/103 |
| 2,496,478 | A | * | 2/1950 | Kinnebrew | 248/103 |
| 2,876,027 | A | * | 3/1959 | Sulmonetti | 403/53 |
| 3,111,296 | A | * | 11/1963 | Ludes | 248/103 |
| 4,887,784 | A | * | 12/1989 | Kayali | 248/311.2 |
| 5,542,136 | A | | 8/1996 | Tappel | |
| 5,863,021 | A | * | 1/1999 | Nichols | 248/229.23 |
| 6,353,187 | B1 | * | 3/2002 | Wilson, Jr. | 174/158 F |
| 7,406,731 | B2 | | 8/2008 | Menkedick et al. | |

OTHER PUBLICATIONS

PCT Search Report for PCT Application No. PCT/US07/84969 for the corresponding PCT application, mailed Aug. 19, 2008.

* cited by examiner

*Primary Examiner* — Anita M King
(74) *Attorney, Agent, or Firm* — Warner Norcross & Judd LLP

(57) ABSTRACT

Hospital equipment includes a member and a clip mounting to the member. The clip includes a first clip member and a second clip member pivotally interconnected with the first clip member about a pivot axis. Each of the first and second clip members has a receiving portion for receiving the member. A biasing member urges the first clip member and the second clip member toward each other wherein when the first clip member and the second clip member straddle the frame or rail member and the frame or rail member is positioned in the receiving portions, the biasing member urges the first and second clip members to engage the frame or rail member. An accessory mounting member is configured for mounting an accessory to the clip and is coupled to one of the clip members wherein the clip may be used for mounting an accessory to the member.

30 Claims, 41 Drawing Sheets

UTILITY CLIP

This application claims the benefit of provisional application, entitled A PATIENT LYING SURFACE WITH TURN-ASSIST, Ser. No. 60/866,206, filed Nov. 16, 2006.

FIELD OF THE INVENTION AND BACKGROUND OF THE INVENTION

The present invention relates to hospital equipment, such as a patient lying surface, with a clip for line management and for mounting devices to the equipment.

SUMMARY OF THE INVENTION

In one form of the invention, a piece of hospital equipment includes a member and a clip mounting to the member. The clip includes a first clip member and a second clip member pivotally interconnected with the first clip member about a pivot axis. Each of the clip members has a receiving portion for receiving the member. A biasing member urges the first clip member and the second clip member toward each other wherein when the first clip member and the second clip member straddle the member and the member is positioned in the receiving portions, the biasing member urges the first and second clip members to engage the frame or rail member. An accessory mounting member is configured for mounting an accessory to the clip, with the accessory mounting member coupled to one of the clip members wherein the clip may be used for mounting an accessory to the member.

In one aspect, the member comprises a siderail.

In another aspect, each of the clip members includes a distal end offset from the receiving portion, with the biasing member further urging the distal ends to abut and contact each other whereby the clip resists rotational movement about an axis transverse to the pivot axis.

In another aspect, the accessory mounting member includes a pair of receiving grooves for mounting an accessory to the accessory mounting member. According to yet a further aspect, the mounting member comprises a plate with opposed edges, with the receiving grooves located inward of the opposed edges.

In another embodiment, the accessory mounting member includes a fastener, which can be used for mounting an accessory to the accessory mounting member. For example, the fastener may include a base portion mounted to the accessory mounting member and a pivotal arm pivotally mounted to the base portion. In another embodiment, the fastener may include a clamp for securing at least one tube to the accessory mounting member. For example, the fastener may include a plurality of clamps.

In another embodiment, the accessory mounting member includes a receptacle. For example, the receptacle may be configured for holding or engaging a cylindrical object, such as a drinking container.

According to yet another aspect, the clip comprises a first clip, and the accessory mounting member is configured to mount a second clip to the first clip. For example, the second clip may comprise a first clip member and a second clip member pivotally interconnected with the first clip member about a pivot axis, with each of the first and second clip members of the second clip having a receiving portion for receiving an accessory, and a biasing member urging the first and second clip members of the second clip toward each other wherein when the first clip member and the second clip member straddle the accessory and the accessory is positioned in the receiving portions of the second clip, the biasing member urges the first and second clip members of the second to engage the accessory.

In a further aspect, the second clip may include a foam member at least one of the receiving portions wherein the second clip may be used to grip one or more tubes.

In other aspects, at least one clip member of the clip members includes a gripping area at least at the receiving area of the at least one clip member. For example, the gripping area comprises a high friction area.

In another form, a clip for mounting to a member of hospital equipment includes a first clip member and a second clip member pivotally interconnected with the first clip member about a pivot axis, with each of the clip members including a plate member and a hollow cylindrical body at a proximate portion of the plate member. The hollow cylindrical portions are aligned and receive therein a pivot pin to thereby form a hinge. Each of the plate members having a transverse extent extending along the pivot axis, a receiving portion for receiving the member of hospital equipment, and a distal edge portion extending along the transverse extent offset from the receiving portion. A biasing member urges the first clip member and the second clip member toward each other, wherein when the first clip member and the second clip member straddle the member and when the member is positioned in the receiving portions, the biasing member urges the first and second clip members to engage the member. Further, an accessory mounting member is mounted to one of the clip members, with the accessory mounting member configured for mounting an accessory to the clip.

In one aspect, the accessory mounting member comprises a fastener for securing an accessory to the clip. For example, in one embodiment, the fastener includes a pivotal arm pivotally mounted at the accessory mounting member, which is moveable between an open position for receiving an accessory and a closed position wherein the accessory is secured to the clip by said fastener. Alternately, the fastener may include a plurality of clamps, with each of the clamps being adapted to engage and releasably secure a tube or wire to the clip.

In another aspect, the accessory attachment member comprises a receptacle. For example, the receptacle may be configured for holding a wide variety of objects, including a cup, a box of tissues, glasses, a remote control device or the like.

In yet another aspect, the accessory attachment member is adapted to couple a second clip to the first clip.

According to yet another aspect, the clip may be used in combination with a shelf, which includes a frame member coupled to one of the clip members and which forms said accessory mounting member.

Accordingly, the present invention provides a universal clip that can be used to mount a wide variety of accessories or objects to a structural member of, for example, hospital equipment, including a patient handling device, such as a bed

BRIEF DESCRIPTION OF DRAWINGS

The detailed description particularly refers to the accompanying figure in which.

DETAILED DESCRIPTION OF THE INVENTION

Figure 1:
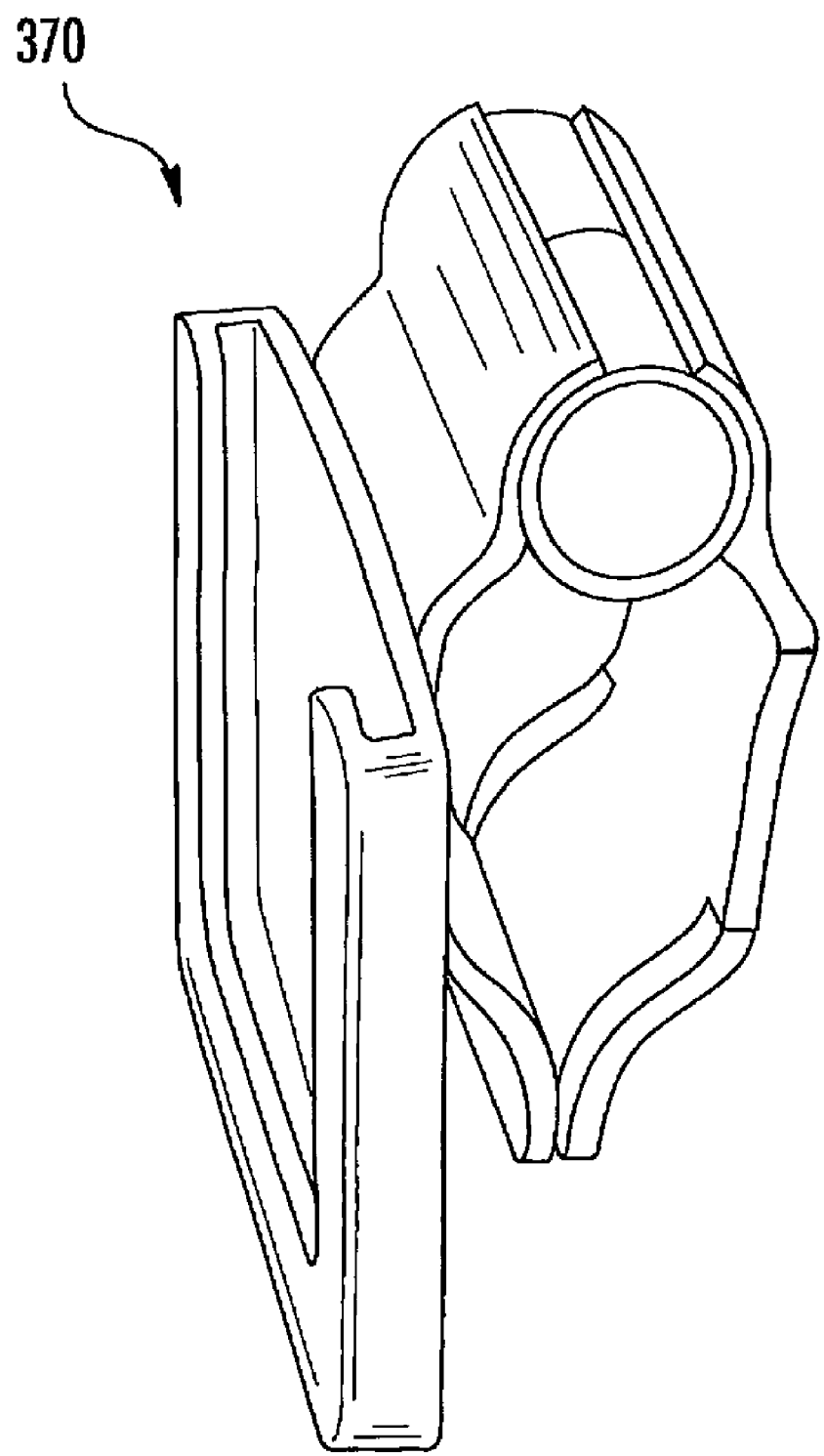
FIG. 1 is an isometric view of a control pendant clip according to one embodiment of the present invention in a closed position.
Figure 1A:
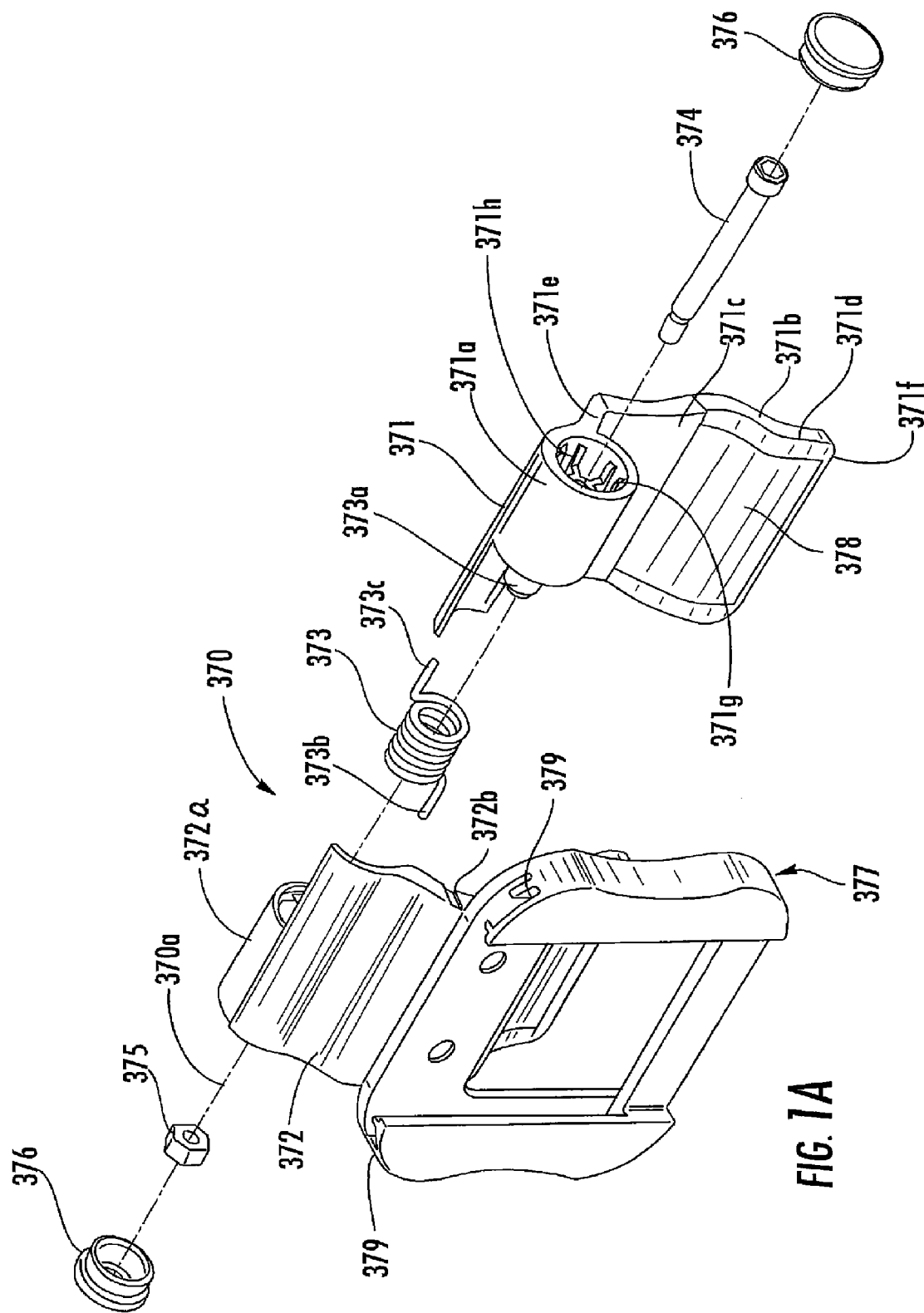
FIG. 1A is an exploded view of a control pendant clip according to one embodiment of the present invention.
Figure 1B:
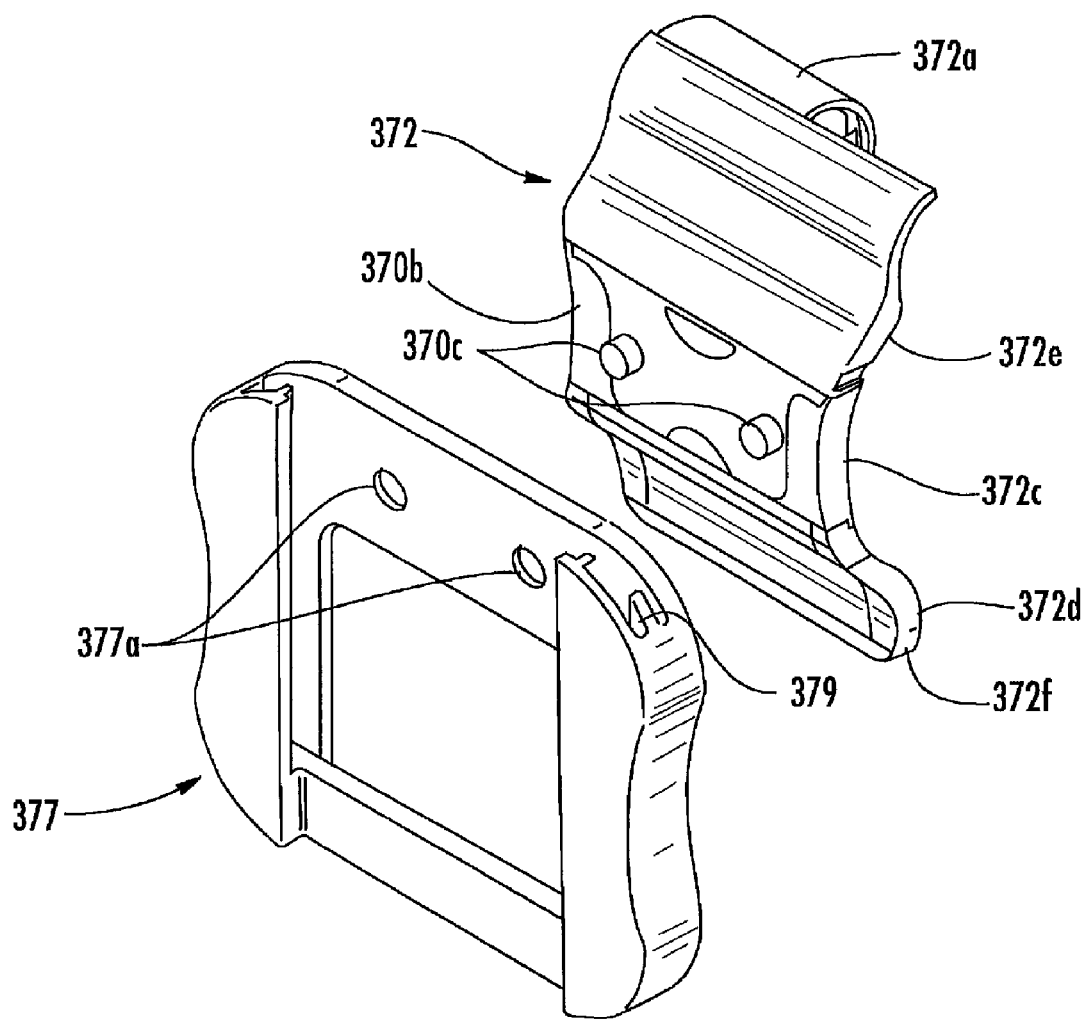
FIG. 1B is an isometric view of a front clip member and a utility securing member from a control pendant clip according to one embodiment of the present invention.

Referring to FIG. 1, the numeral 370 generally designates a clip of the present invention. Clip 370 is configured to mount to a variety of different shaped components, typically structural members of a piece of hospital equipment, including furniture, an IV pole, a patient handling device, such as a hospital bed, a stretcher, a cot, a wheel chair, or the like. Further, as will be more fully described below, clip 370 provides a mounting surface for various accessories so that the various accessories may be mounted to, for example, the equipment. Though described and illustrated in reference to a patient handling device, it should be understood that clip 370 may be used to mount various accessories to other hospital equipment, as noted, including furniture, an IV pole or any other equipment that has a member that can be engaged by the clip and, moreover, support the clip and the desired accessory.

As best seen in FIGS. 1, 1A, 1B, and 2-4, clip 370 comprises a pair of clip members 371 and 372 that are pivotally connected together about a pivot axis 370a. Further, clip members 371 and 372 are biased in a manner to urge the clip members toward each other so that when the clip members straddle a structural member, such as a side rail member on a hospital bed, the clip members engage the structural member. In addition, at least one of the clip members is provided with a mounting surface 370b for mounting an accessory to the clip and ultimately to the structural member.

Referring again to FIG. 1A, each clip member 371, 372 is formed from a plate member 371b, 372b, which is coupled to or formed with a pivot shaft 371a, 372a at their respective upper edges. Pivot shafts 371a and 372a are aligned along axis 370a and receive a pivot pin 374 therethrough to thereby pivotally couple the two clip members together. Pivot pin 374 is secured in pivot shafts 371a and 372a by a nut 375 and, further, is enclosed in shafts 371a and 372a by covers 376.

Plate members 371b and 372b are optionally formed from a plastic material and are configured, such as by molding, to at least partially wrap around the structural member so that the inwardly facing surface of the plate members provides a receiving portion that makes contact with the structural member over at least discrete areas of the structural member rather than simply a line contact. However, it should be understood that in some applications, a line contact between one or more of the clip members and the structural members may be adequate.

Figure 2:
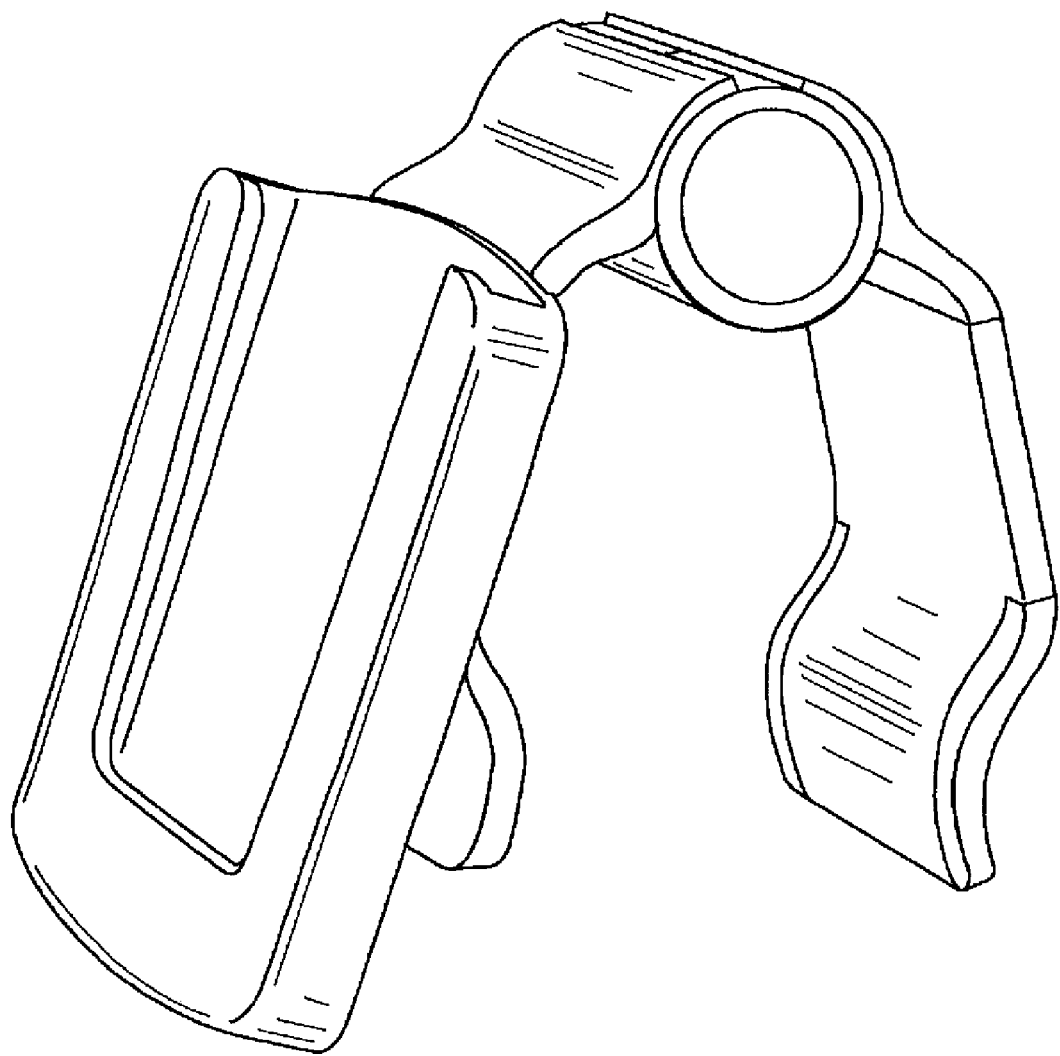
FIG. 2 is an isometric view of a control pendant clip according to one embodiment of the present invention in a fully opened position.
Figure 3:
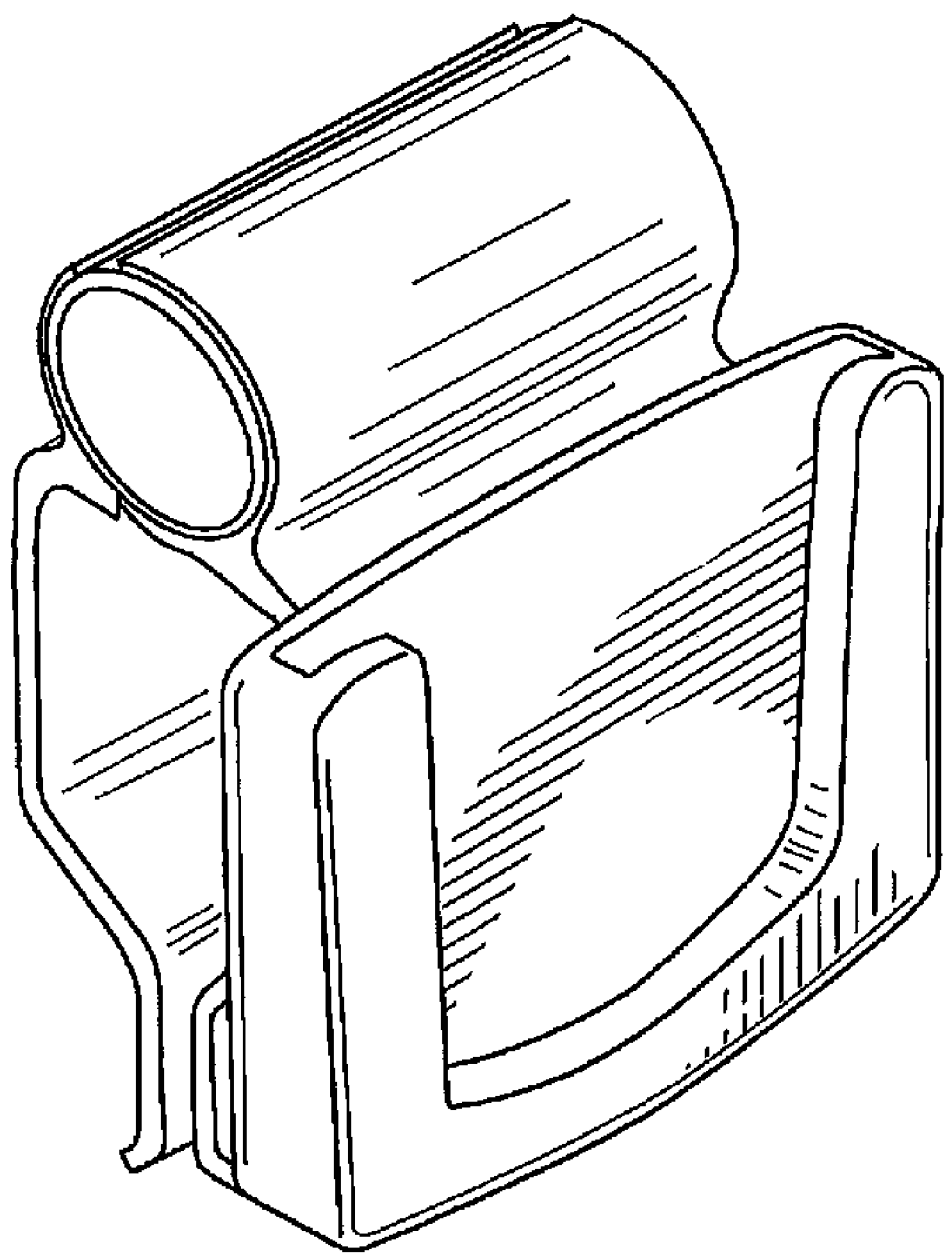
FIG. 3 is an isometric view of a control pendant clip according to one embodiment of the present invention in a closed position.
Figure 4:
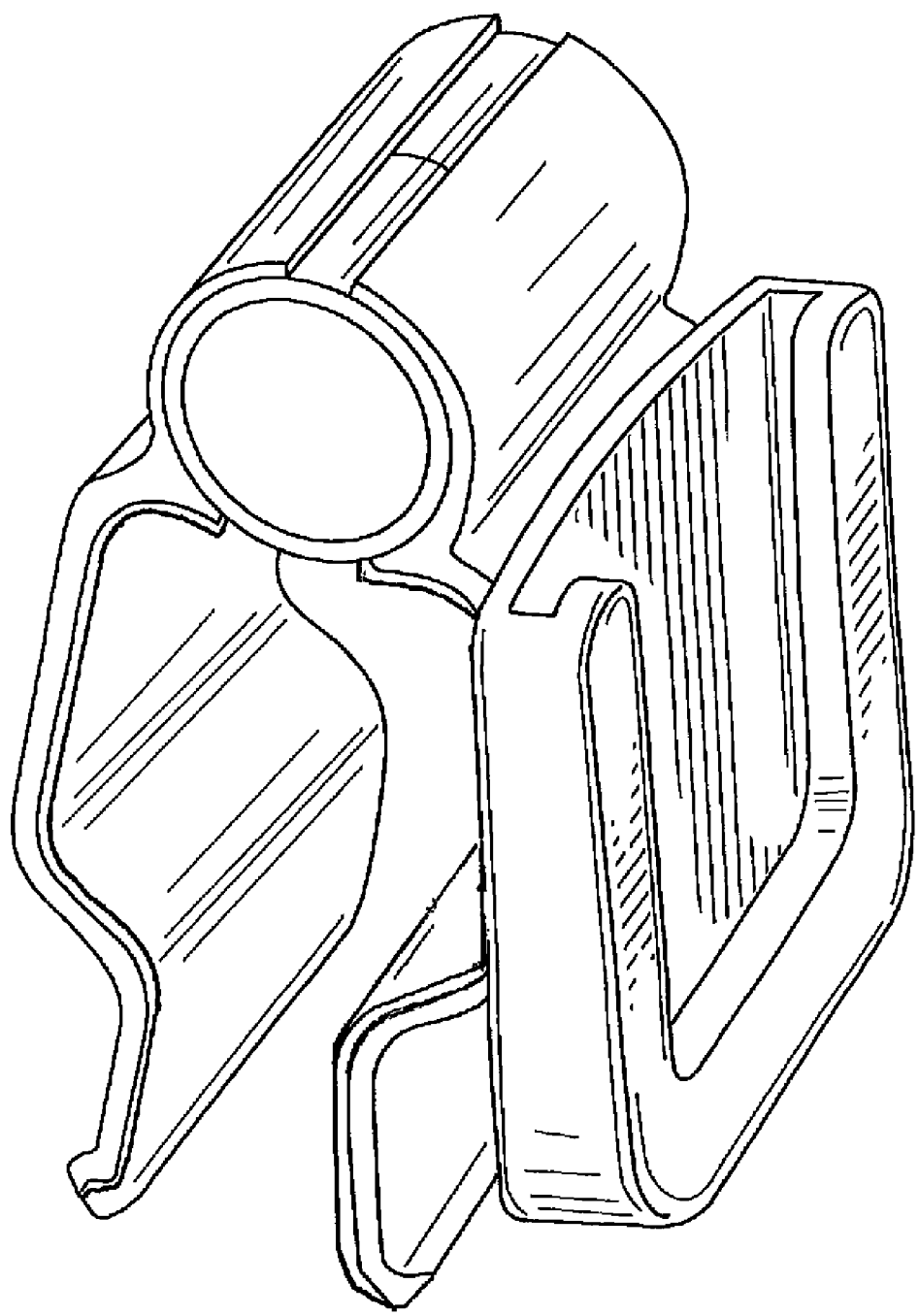
FIG. 4 is an isometric view of a control pendant clip according to one embodiment of the present invention in a partially opened position.
Figure 5:
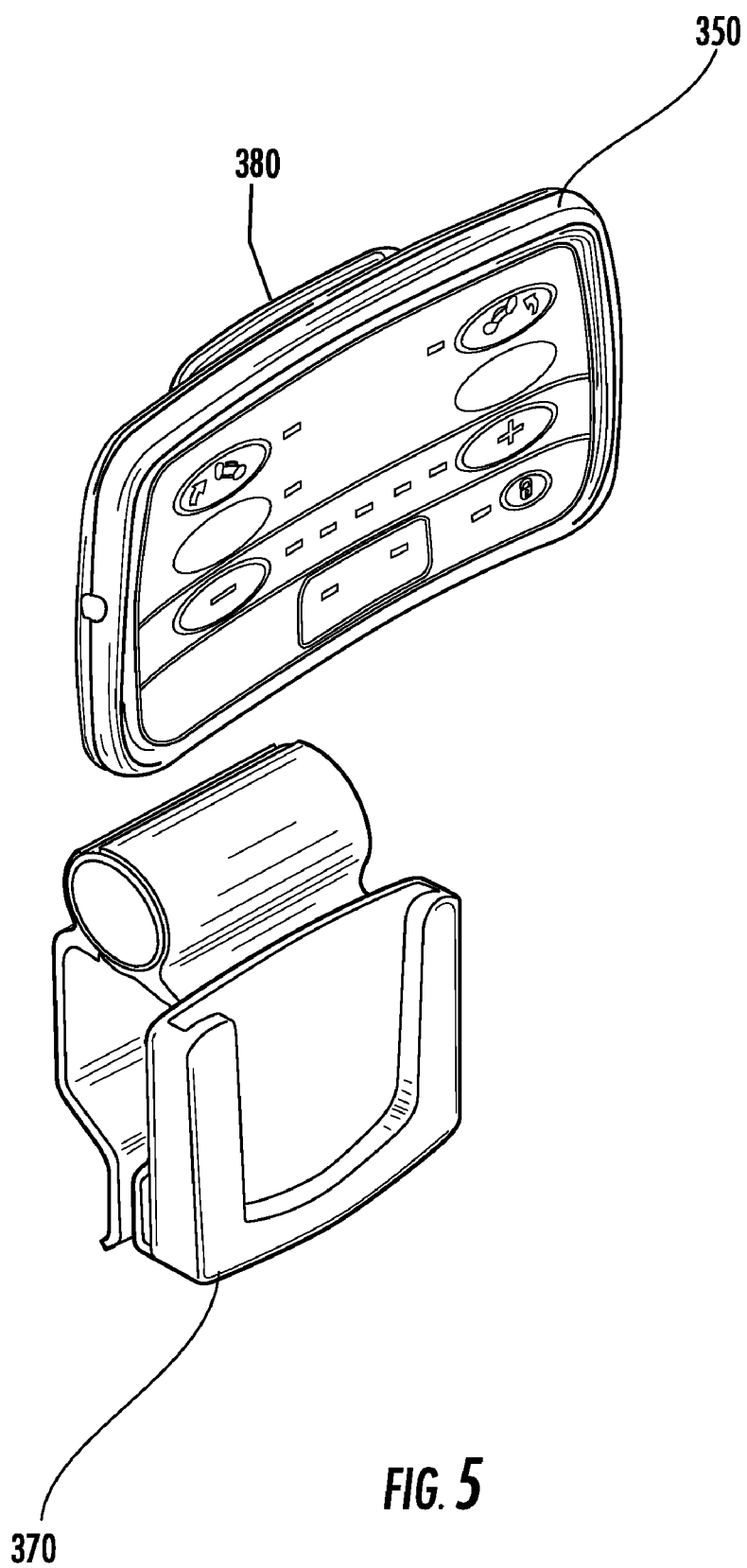
FIG. 5 is an isometric view of a control pendant and control pendant clip of a patient lying surface according to one embodiment of the present invention.
Figure 6:
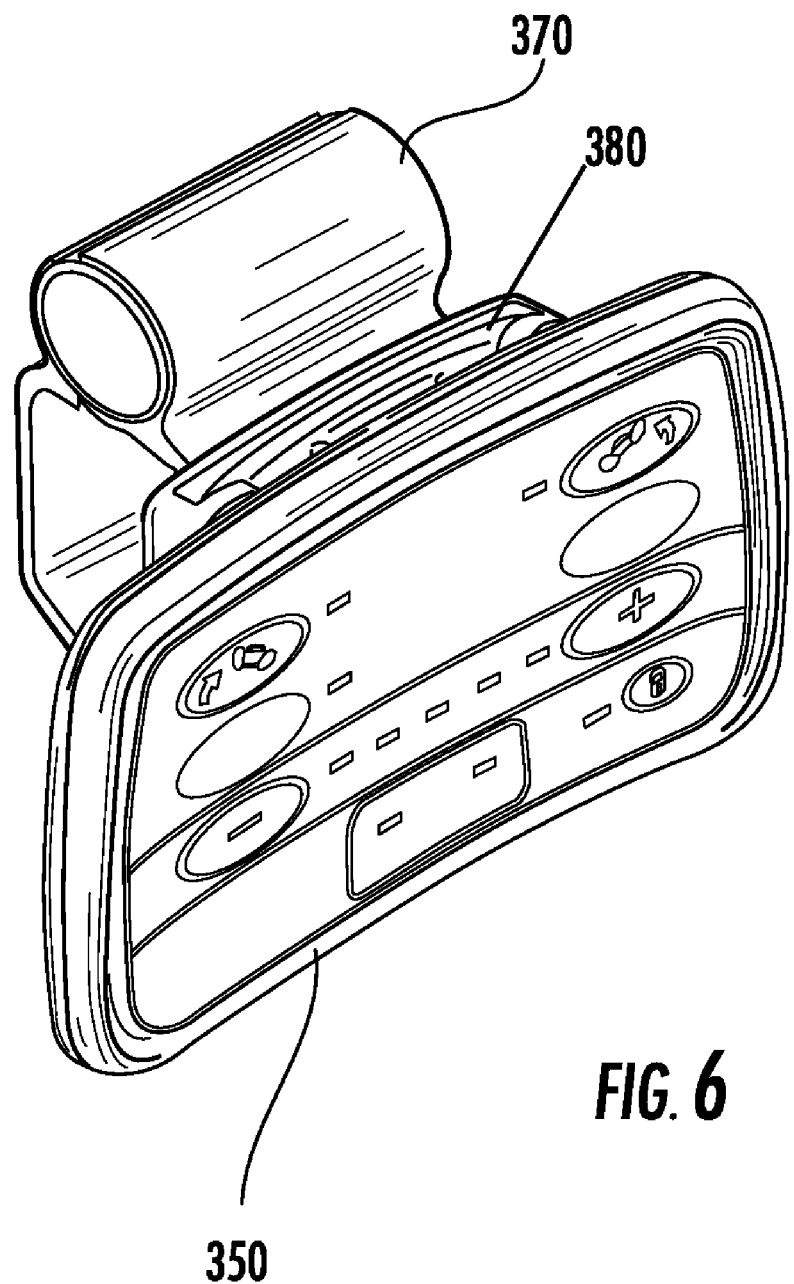
FIG. 6 is an isometric view of a control pendant mated with a control pendant clip of a patient lying surface according to one embodiment of the present invention.
Figure 7:
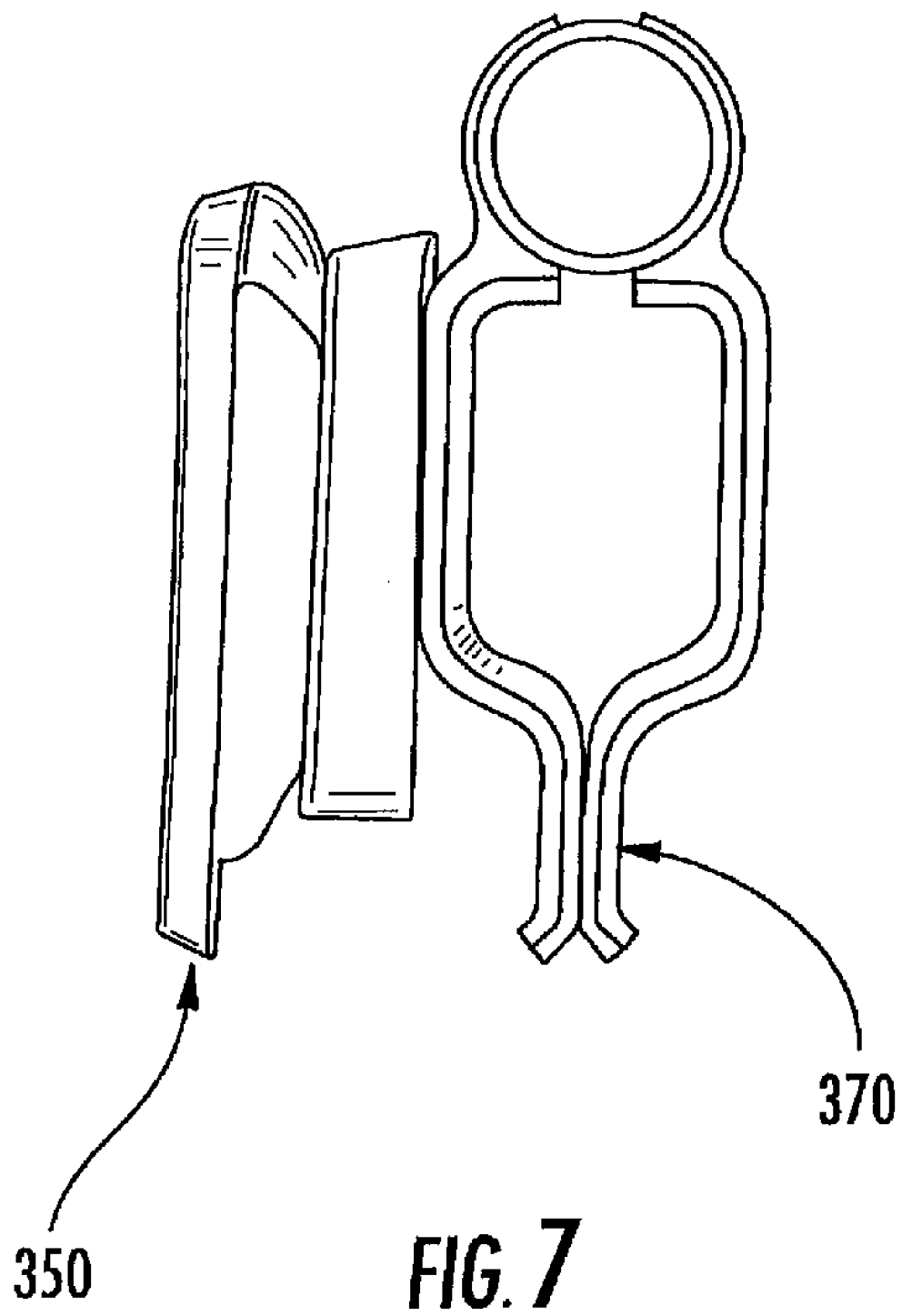
FIG. 7 is side view of a control pendant mated with a control pendant clip of a patient lying surface according to one embodiment of the present invention.
Figure 8:
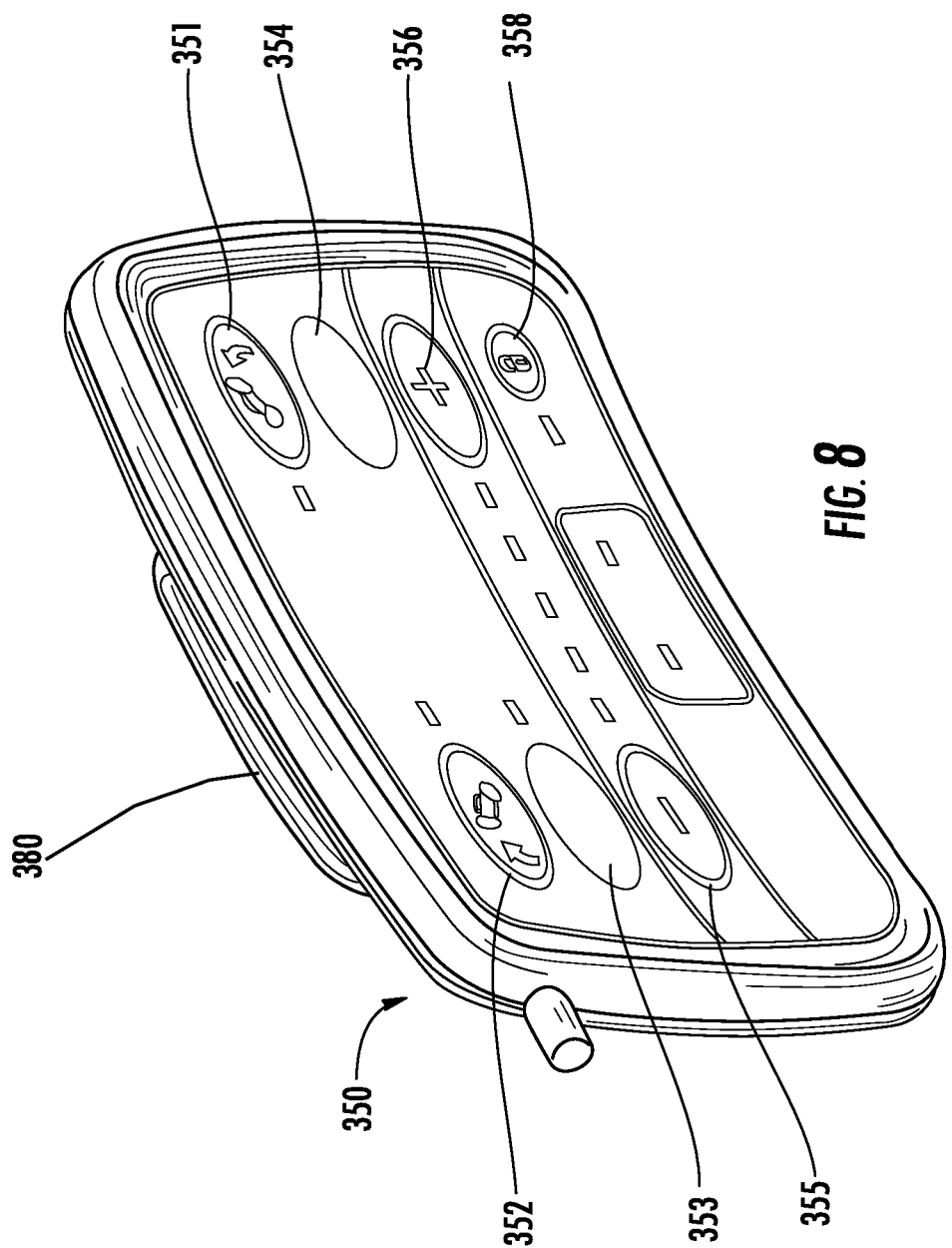
FIG. 8 is an isometric view of a control pendant according to one embodiment of the present invention.
Figure 9:
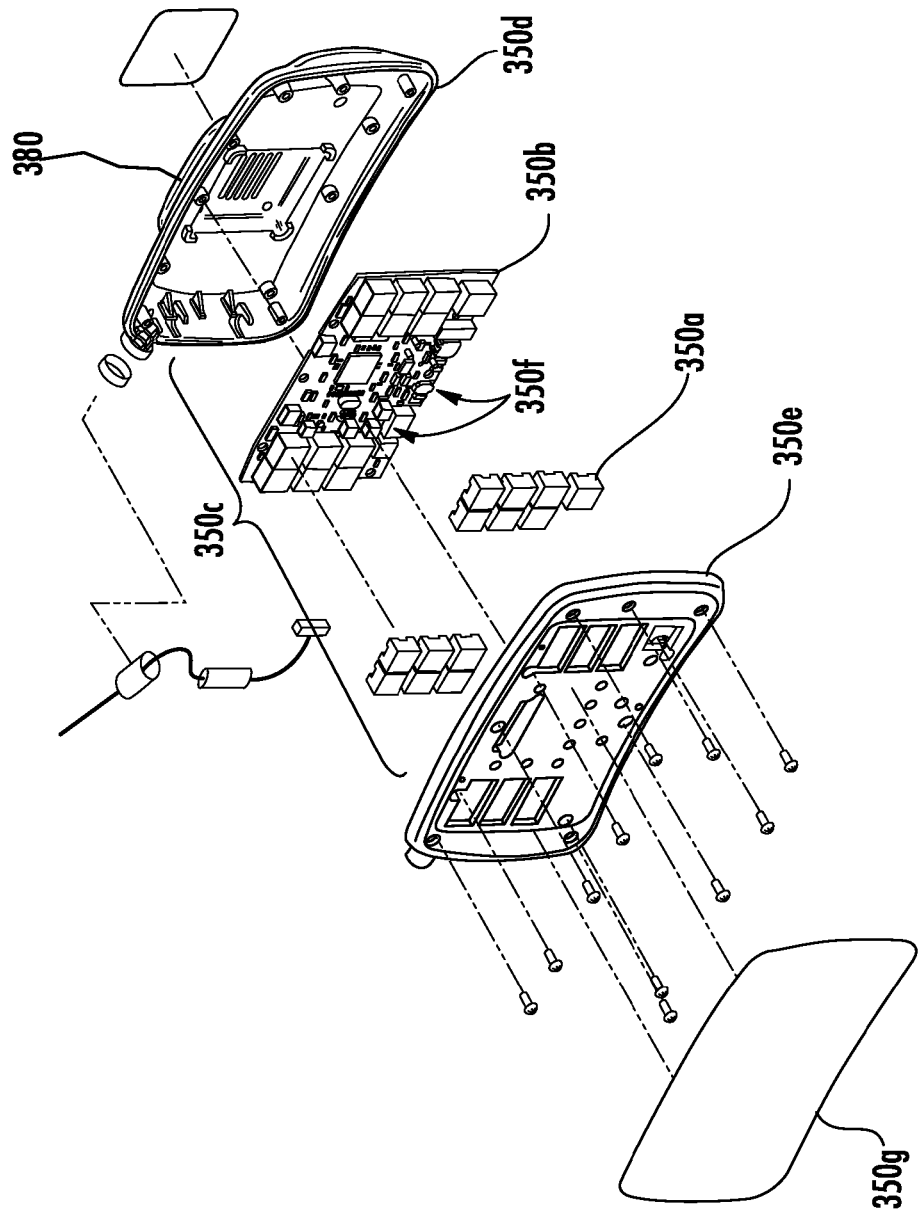
FIG. 9 is an exploded view of a control pendant according to one embodiment of the present invention.
Figure 10:
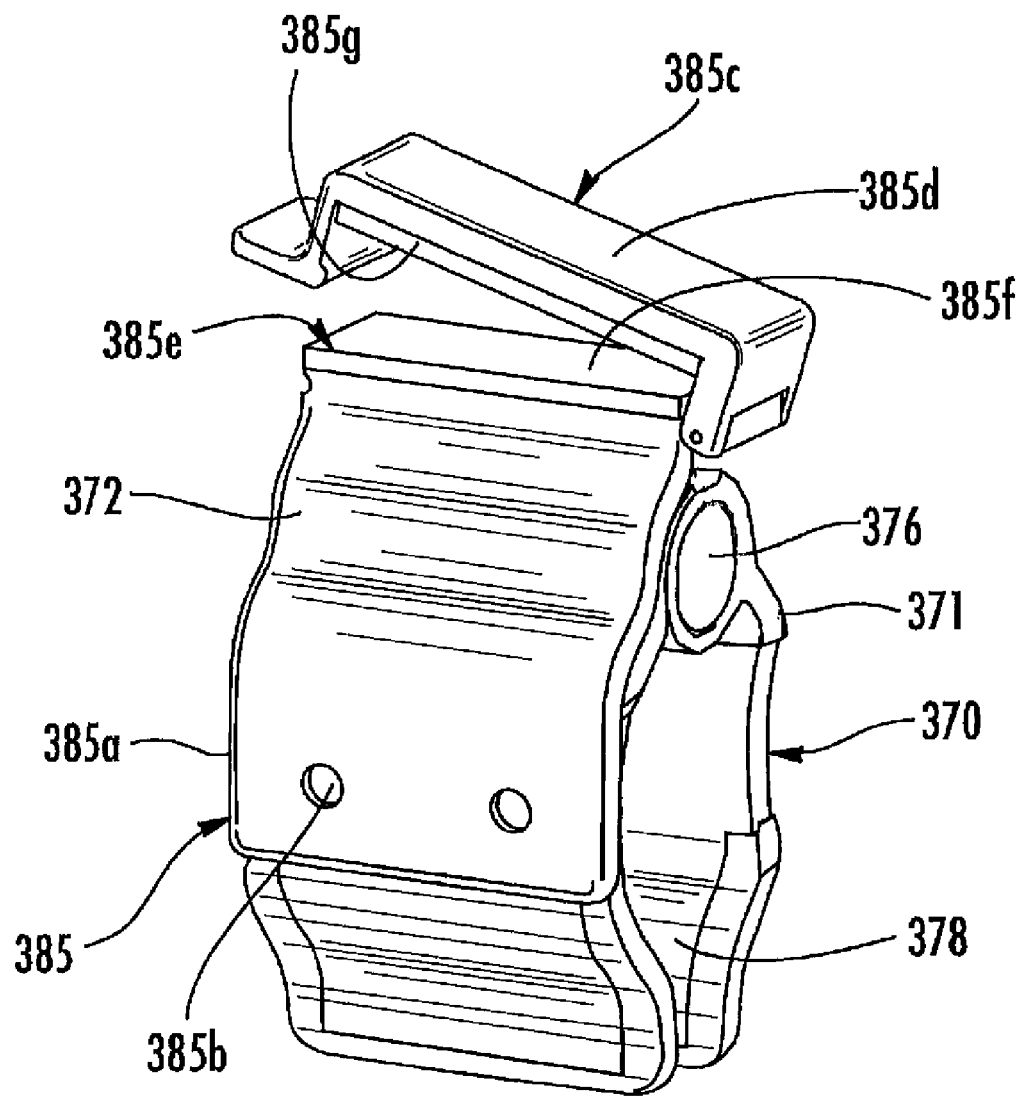
FIG. 10 is an isometric view of a control pendant clip with a line management fastener in an opened position according to one embodiment of the present invention.
Figure 11:
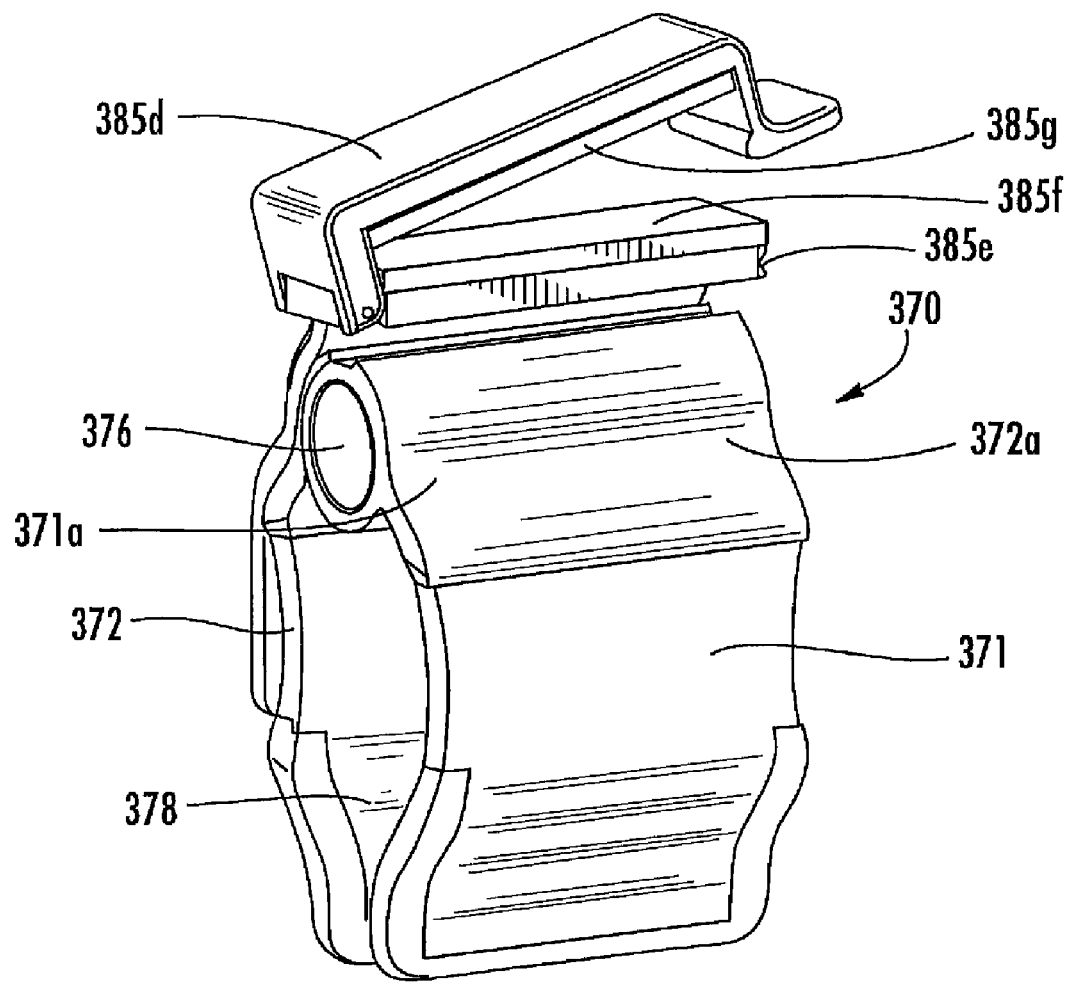
FIG. 11 is an isometric view of a utility clip with an IV holder in an opened position according to another embodiment of the present invention.

As best seen in FIGS. 1, 2, and 3, the inwardly facing sides of clip members are provided with gripping areas 378, such as areas of material with a high coefficient of friction, such as rubber. This surface may be applied, such as by spraying or adhesively attaching a layer of high friction surface or may be injection molded with the respective plate member. In this manner, the gripping areas may improve the frictional coupling between the clip and the structural mounting member to which the clip is mounted.

As noted, clip members 371 and 372 may be configured to at least partially wrap around the structural member. In the illustrated embodiment, when in its fully closed position and as viewed in FIG. 1, each plate member 371b, 372b includes a general central region 371c, 372c, which forms a receiving portion, an inwardly angle portion 371d, 372d at a lower portion of the plate member, and an inwardly angled portion 371e, 372e at the upper portion thereof, which connects or is molded to the respective pivot shaft (371a, 372a). Further, lower or distal edge portions 371f, 372f of the plate members extend generally downwardly in a general vertical orientation (as viewed in FIG. 1) from angled portions 371d, 372d. Depending on the size of the structural member, the lower distal edge portions 371f, 372f may contact and further bear against each other when the clip is mounted to the structural member. In this manner, the bearing force generated between the lower or distal edge portions 371f and 372f may provide additional torsional resistance and, hence, stability to the clip when the clip is mounted to a structural member. However, it should be understood that the depending on the size of the structural member, the distal edge portions may not make contact.

As noted previously, clip members 371 and 372 are biased toward each other. In the illustrated embodiment, clip members 371 and 372 are biased by a spring 373, such as coil spring, which is located in pivot shafts 371a and 372a about a post 373a and with the ends 373b, 373c of the spring engaging, for example, internal ribs 371g provided in shafts 371a, 372a. In this manner, clip member 371 and clip member 372 can be opened through opposite rotational movements thereof around the pivot axis formed by the pivot pin 374 against the force of the spring, but with the spring applying a biasing force to return the clip members to their closed position (FIG. 1). Ribs 371g comprise radial ribs and are joined at their distal ends in the central passages of shafts 371a, 372a by an annular member 371h, which provides a guide for pin 374.

In the illustrated embodiment, the accessory comprises an accessory mounting member 377, namely a bracket, and a control module interface 350, referred to herein as a control pendent. In order to mount pendent 350 to bracket 377, bracket 377 includes a pair of opposed grooves 379. The back side of control pendant 350 includes a complementary flange 380 (FIGS. 5, 6, 8, and 9), which can be slidably and removably mated with grooves 379 of control pendant clip 370.

Referring again to FIG. 1B, mounting surface 370b is provided at the outwardly facing side of clip member 372. In the illustrated embodiment, mounting surface 370b includes a pair of projecting cylindrical shaped bodies 370c that extend into corresponding openings 377a provided in bracket 377. Optionally, an adhesive may be applied between the respective facing surfaces of the clip member 372 and bracket 377 and about bodies 370c, with bodies 370b acting like dowels. Alternately, bodies 370c may be provided with or formed from a high friction surface to provide a frictional coupling between bracket 377 and clip member 372. A snap fit coupling may also be provided. For example, bodies 370c may include an enlarged annular lip that either engages bracket 377 at openings 377a, for example, by engagement with a corresponding groove provided in opening or by extending through the openings.

In this manner, clip 370 can then be coupled to any part of the patient support apparatus or bed, such as, without limitations, a siderail, a footboard, a headboard, a frame system, by simply positioning clip members 371, 372 on opposite sides of such part of the patient support apparatus or bed and releasing one of the clip members. Further, when mounted in pivot shafts 371a and 372a, spring 373 may be pre-tensioned so that the spring force in spring 373 will then cause the clip members to apply pressure on the part of the patient support apparatus or bed even when the clip members are in their fully closed position (FIG. 1) resulting in the control pendant clip 370 being firmly coupled thereto. As noted, griping areas 378 of clip members will provide added frictional force to prevent pendant clip 370 from accidentally moving or becoming decoupled.

For example, griping areas 378 may be made of, or covered with, a material with a friction coefficient in the range of about 2.0 to 3.0, or in the range of about 1.0 to 2.0, or in the range of about 0.5 to 3.0. For example, the material may have a friction coefficient of about 3.0, a friction coefficient of about 2.0, or a friction coefficient of about 1.0.

According to an embodiment of the present invention, depicted in FIGS. 10-13, clip 370 may couple to an accessory mounting member in the form of a line management fastener 385, which may be used to manage wires from, for example, control pendant 350. In this configuration, clip 370 enables the grouping of one or more wires from control pendant 350 to be located and supported on the upper side of clip 370. As such, the interference from the wires with other components of the lying surface or patient support apparatus is minimized, thereby also minimizing the risks of inadvertently disconnecting the wires and of injury.

Figure 12:
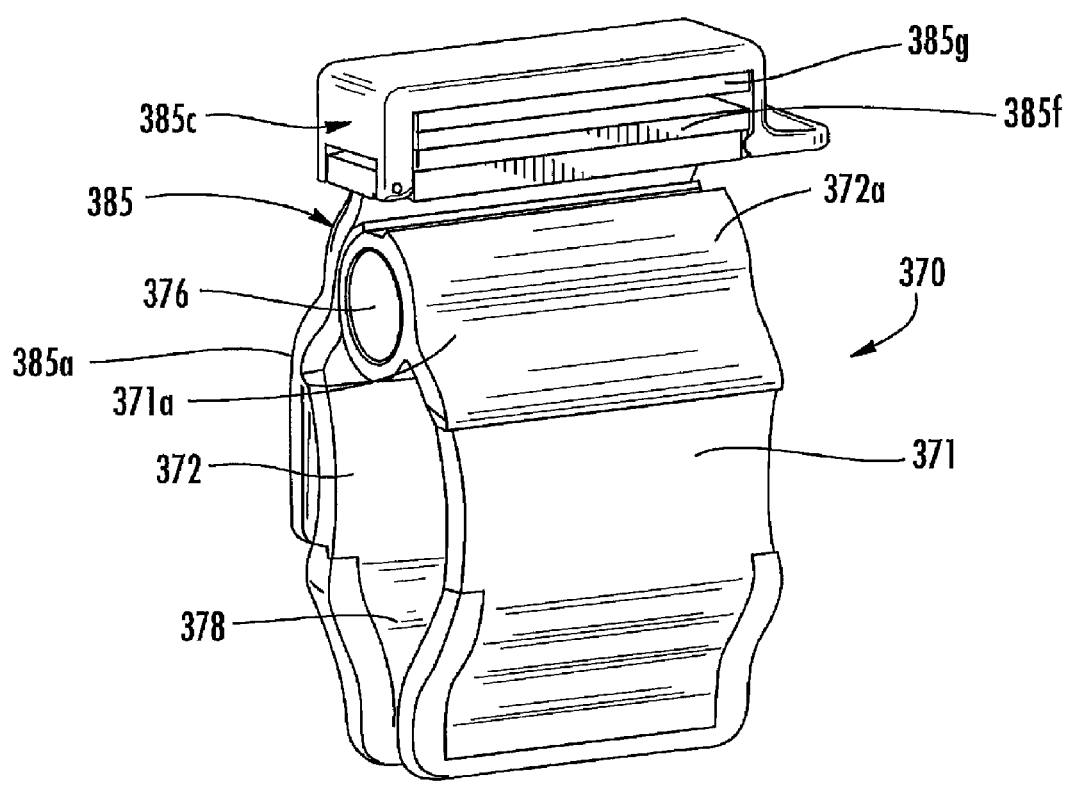
FIG. 12 is an isometric view of a utility clip with an IV holder in a closed position according to another embodiment of the present invention.
Figure 13:
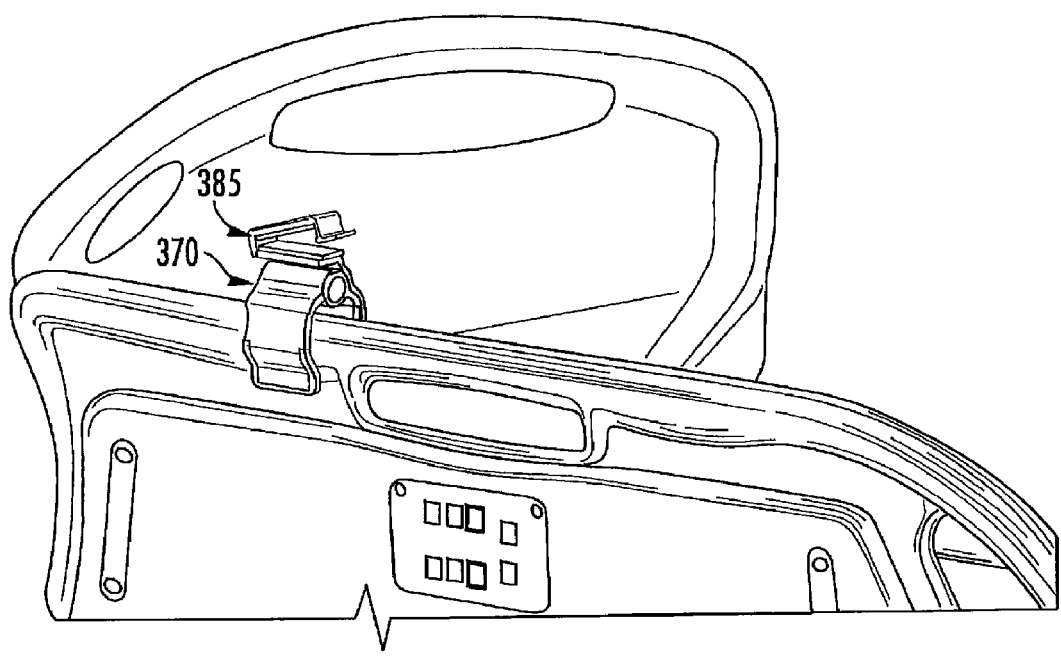
FIG. 13 an isometric view of a utility clip with an IV holder in an opened position secured to a siderail according to another embodiment of the present invention.

Line management fastener 385 includes a plate member 385a, which is configured to overlay clip member 372 and which includes openings 385b, for receiving bodies 370c of clip member 372 similar to bracket 377. Further, plate member 385a extends upwardly above pivot shafts 371a, 372a and includes mounted at its upper end a clip or fastener 385c, which has a pivotal arm 385d and base 385e. Both arm 385d and base 385e may have a pad 385f, 385g, such as a resilient pad, including a rubber or foam pad, so that wires may be frictionally held between the respective pads when arm 385d is pivoted to its closed and latched position on base 385e (FIG. 12). Alternately, clip 385 may be used to hold IV tubes in which case the pads may help preventing the undesirable pinching of IV tubes. Pads 385f and 385g may have an Indentation Load Deflection (ILD) of in a range of 100-70, for example a ILD of 100, 90, 85, 80, 75, or 70. For example, pads 385f, 385g may have an ILD of 60 to 85, an ILD of 41-60, or an ILD of 33 to 40.

Figure 14:
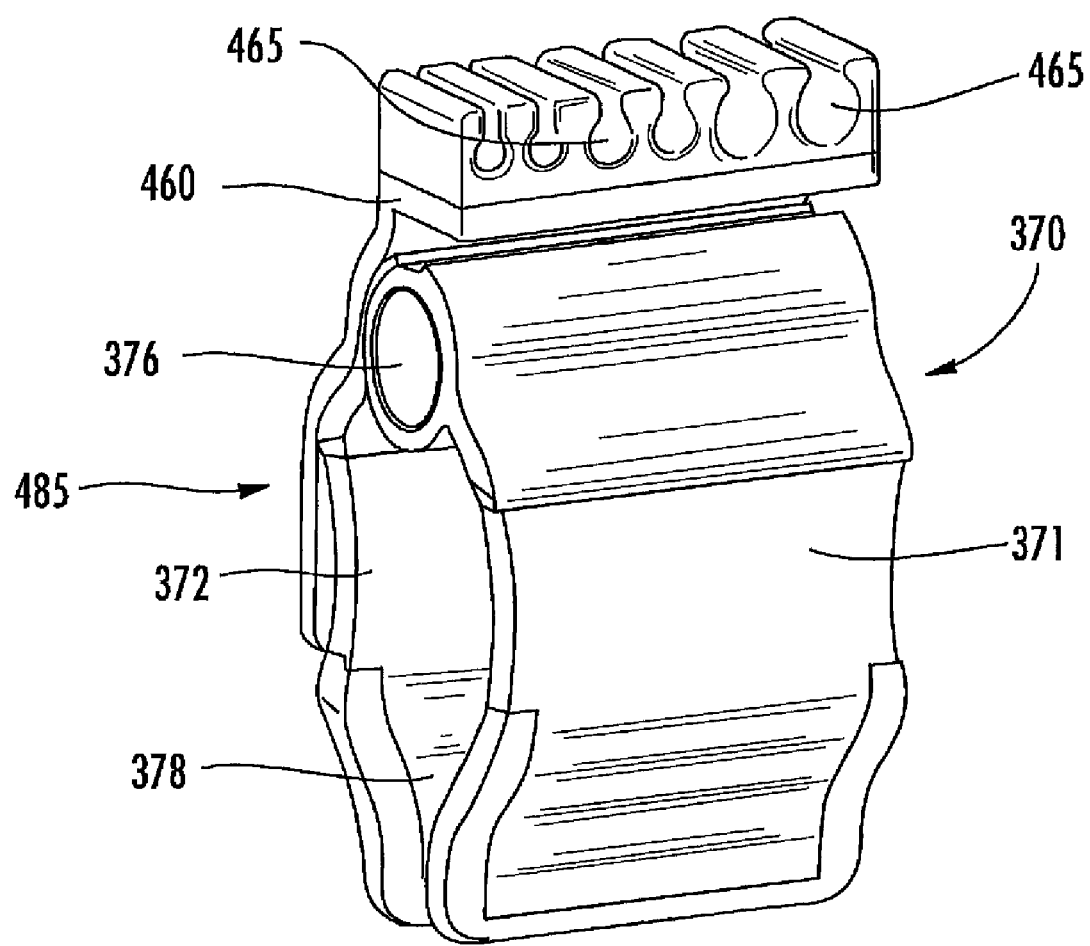
FIG. 14 is a back isometric view of a utility clip with an alternative IV holder according to an embodiment of the present invention.
Figure 15:
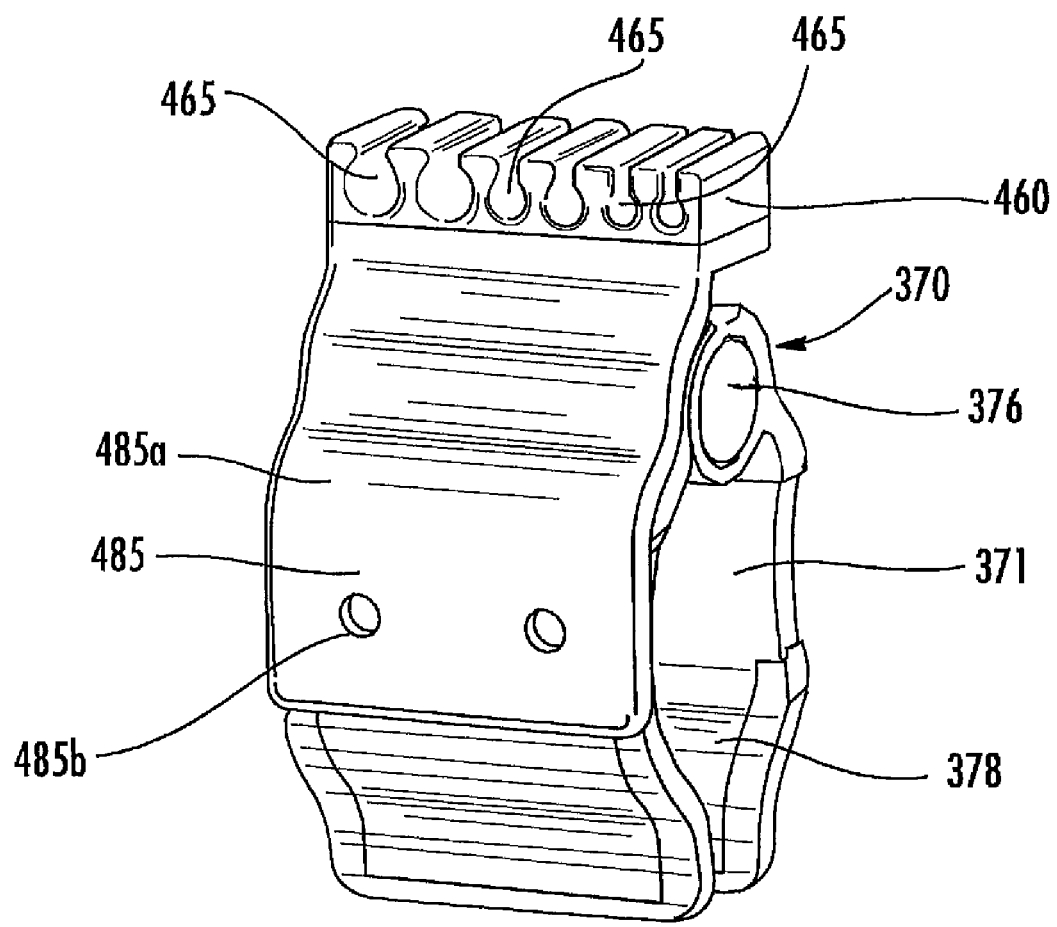
FIG. 15 is a front isometric view of a utility clip with an alternative IV holder according to an embodiment of the present invention.
Figure 16:
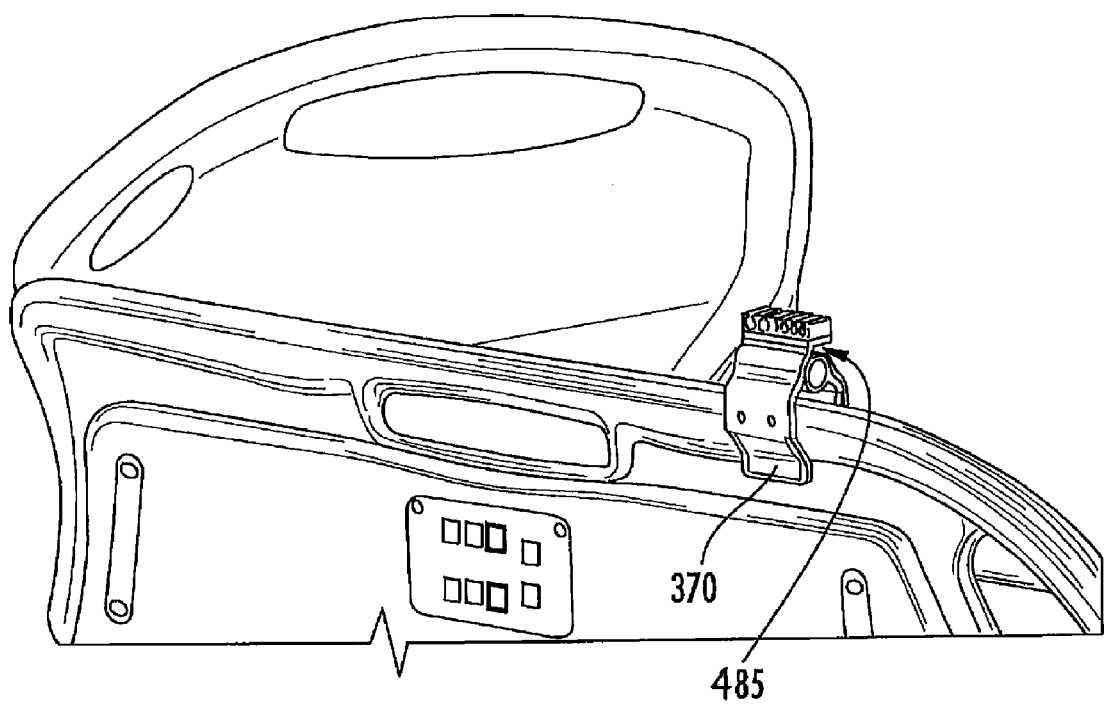
FIG. 16 is a front isometric view of a utility clip with an alternative IV holder according to an embodiment of the present invention.

Referring to FIGS. 14-16, clip 370 may be used to support another embodiment of a line management fastener 485. Line management fastener 485 similarly includes a plate 485a with openings 485b to mount fastener to clip 370. In the illustrated embodiment, fastener 485 includes a body 460 at the upper end of plate 485 that is formed from a resilient material and includes a plurality of recesses 465 formed therein for receiving and holding tubes or wires. Recesses 465 are formed inwardly from the upper surface of body 460 and further have constricted openings at the upper surface to thereby form clamps. The clamps may vary in size to accommodate different size tubes or wires. Several tubes or wires can thus be managed and held in place by clamping them in securing clamps 465 which complement the sizes of said tubes and wires. Thus fastener 485 provides a snap-in type tube management system.

Figure 17:
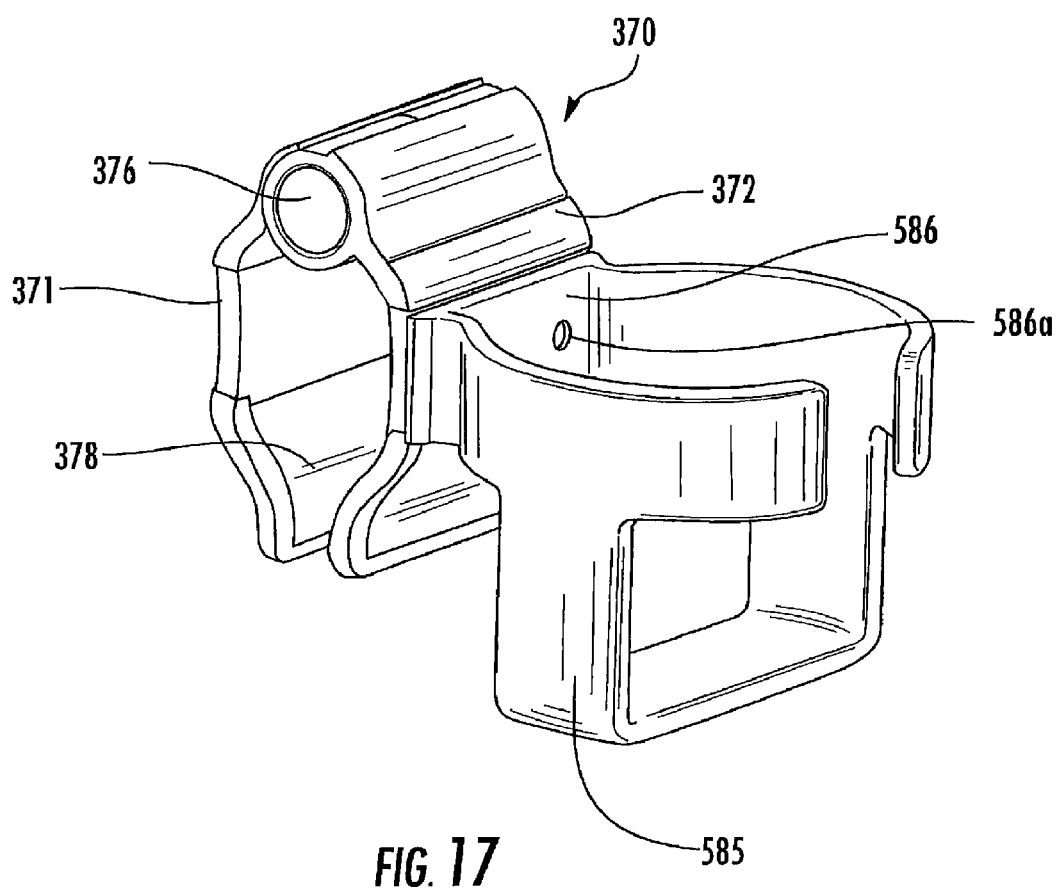
FIG. 17 is an isometric view of a utility clip with a cup holder according to an embodiment of the present invention.
Figure 18:
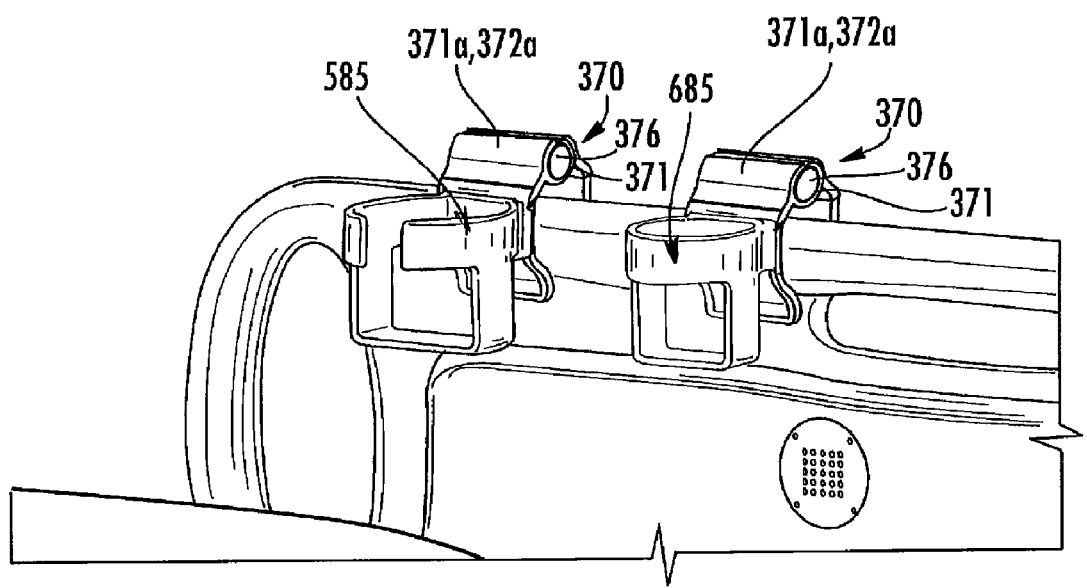
FIG. 18 is an isometric view of utility clips with a cup holder and a glass holder secured to a siderail according to an embodiment of the present invention.
Figure 19:
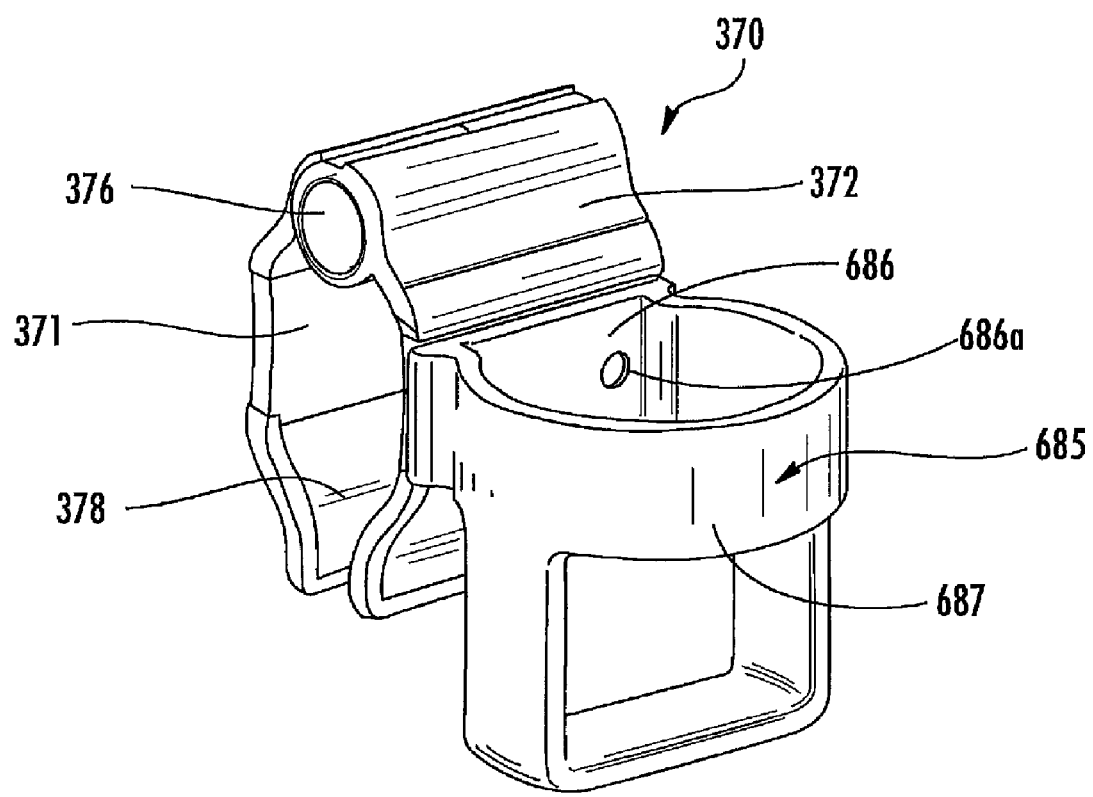
FIG. 19 is an isometric view of a utility clip with a glass holder according to an embodiment of the present invention.

In other embodiments of the present invention, control pendant clip 370 can be used for other purposes. For example, FIGS. 17-19 illustrate respectively a clip with a cup or glass holder or other cylindrical objects. As best seen in FIG. 17, clip 370 is coupled with a cup holding member 585. Cup holding member 585 includes a rearward plate 586 with a plurality of openings 586a for coupling to bodies 370c of clip 370 in a similar manner to the previous embodiments. Clip 370 may be mounted to a glass holding member 685 which has a plate 686 with openings 686a and a closed upper annular member 687.

Figure 20:
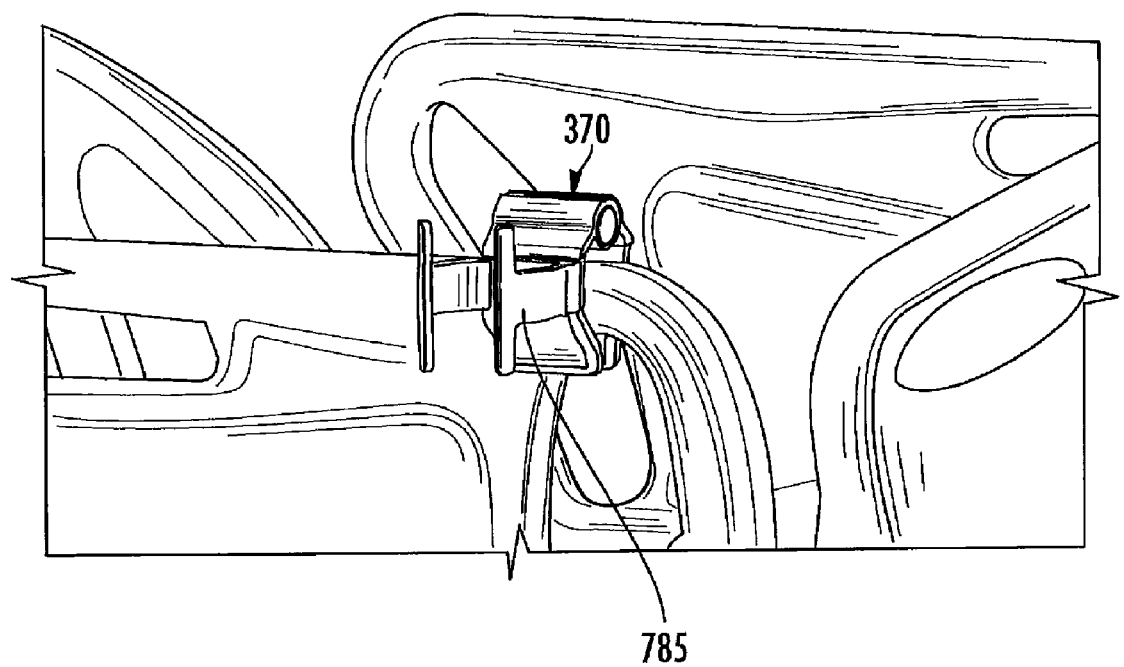
FIG. 20 is an isometric view of a utility clip with a hook holder secured to a siderail according to an embodiment of the present invention.
Figure 21:
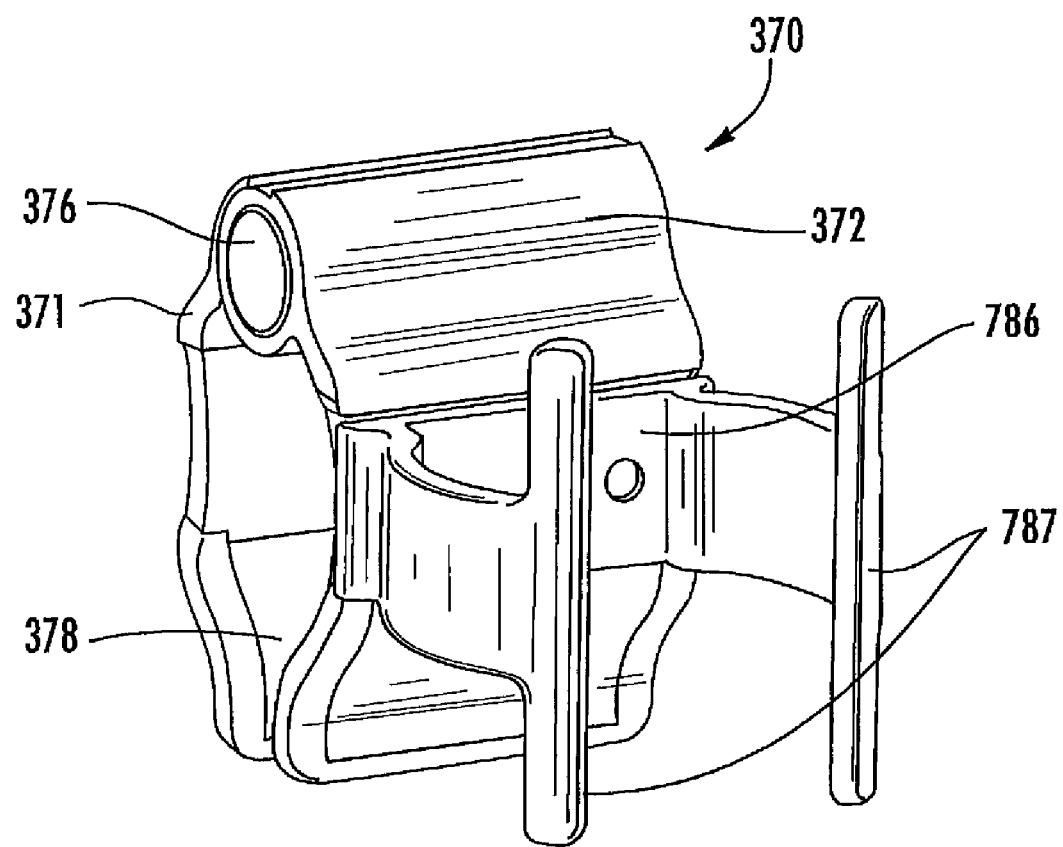
FIG. 21 is an isometric view of a utility clip a hook holder according to an embodiment of the present invention.

According to an embodiment of the present invention depicted in FIGS. 20 and 21, a clip 370 is provided with another holding member 785, which is also configured to engage a cylindrical object (similar to members 585 and 685). However, in this embodiment, member 785 may be formed without a bottom support surface and instead is formed from two resilient C-shaped arms 787 that extend from plate 786. Arms 787 may be used to mount the clip to a cylindrical member, such as a pole, or may simply provide a pair of outwardly projecting hooks on which items may be suspended or dropped. In this embodiment, multiple medical equipments can be supported by holding member 785, such as, without limitations, bottles, stethoscopes, pressure measuring devices, etc.

Figure 22:
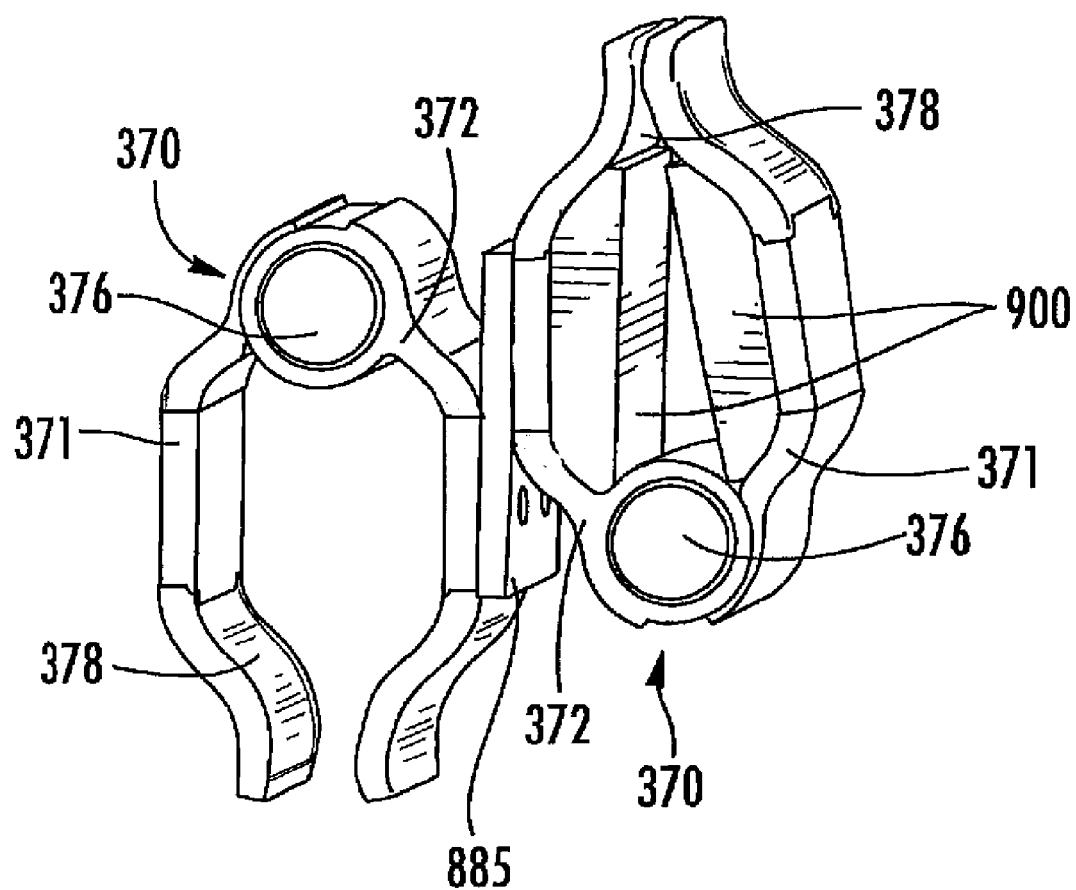
FIG. 22 is an isometric view of a utility clip with an IV holder with a foam member according to an embodiment of the present invention.
Figure 23:
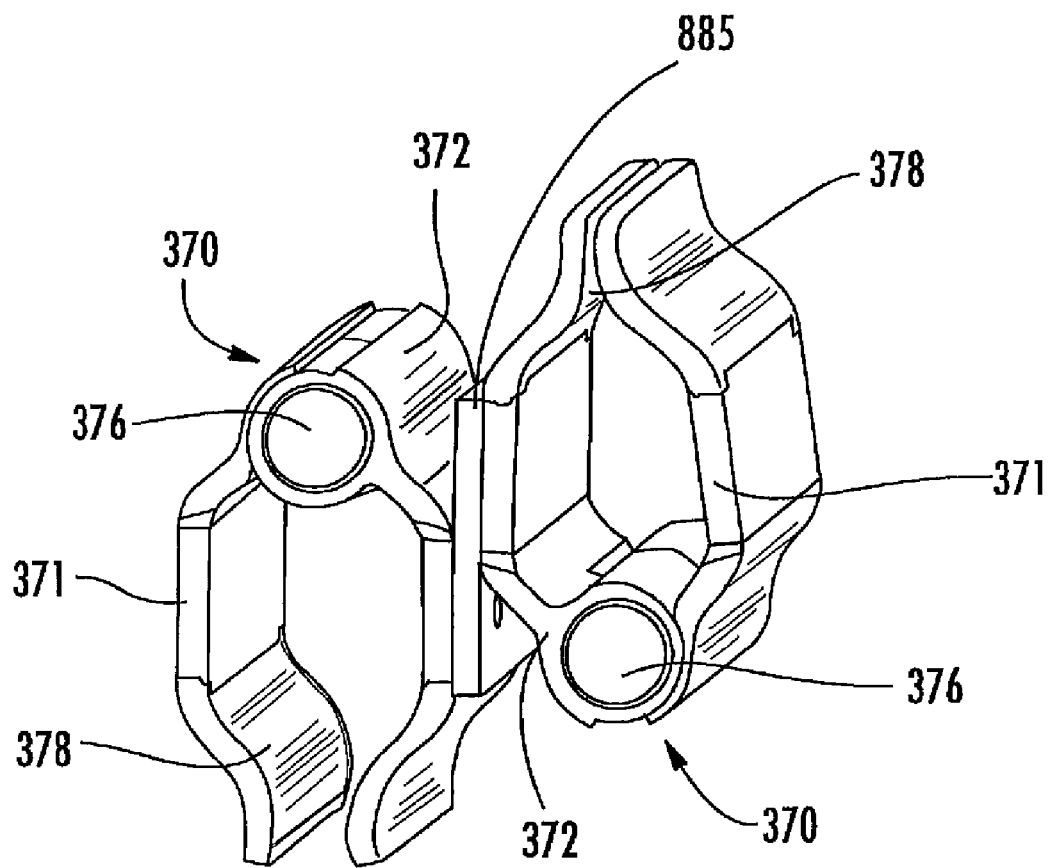
FIG. 23 is an isometric view of a utility clip with an IV holder according to an embodiment of the present invention.
Figure 24:
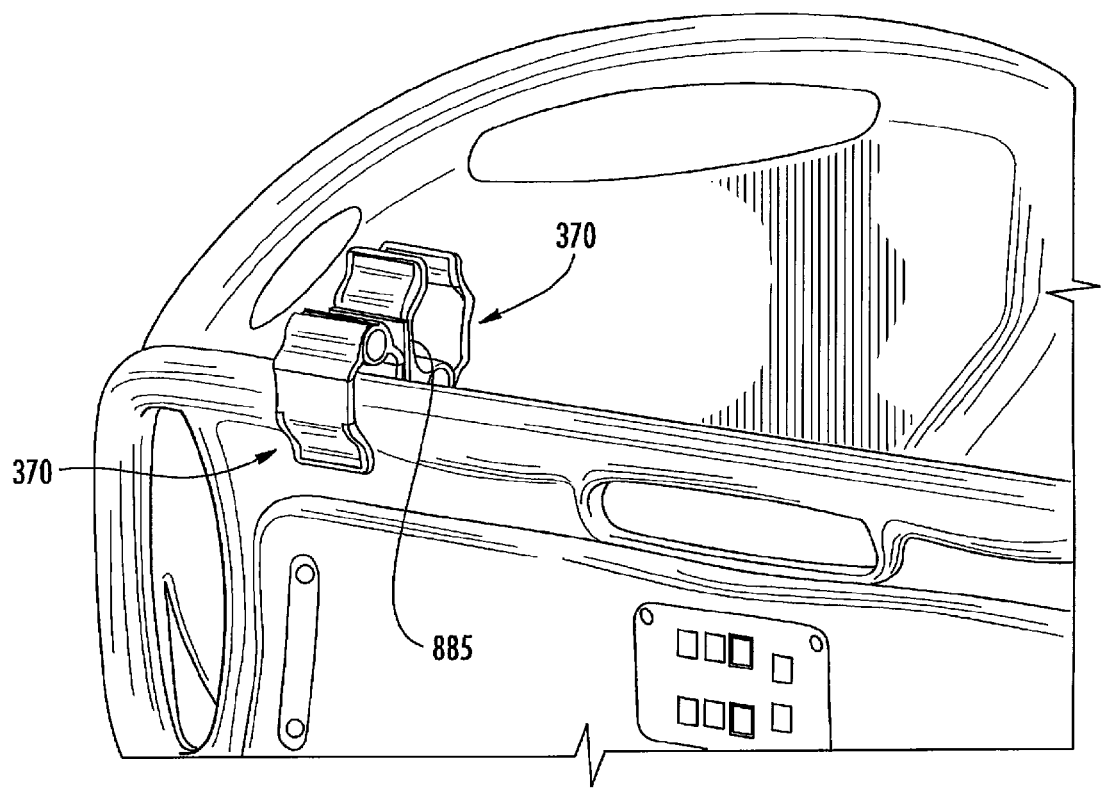
FIG. 24 is an isometric view of a utility clip with an IV holder secured to a siderail according to an embodiment of the present invention.
Figure 25:
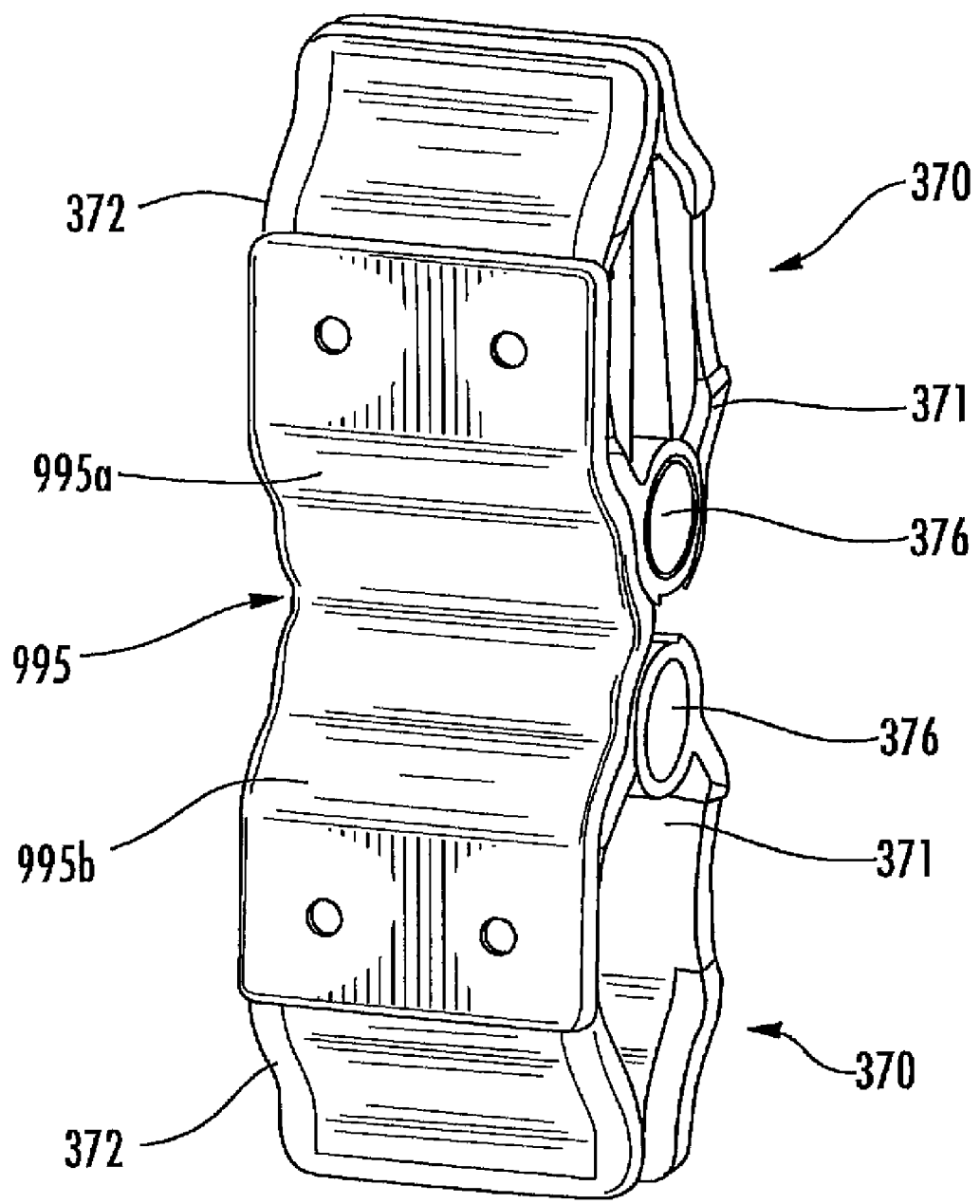
FIG. 25 is an isometric view of a utility clip with an IV holder and an attachment member according to an embodiment of the present invention.
Figure 26:
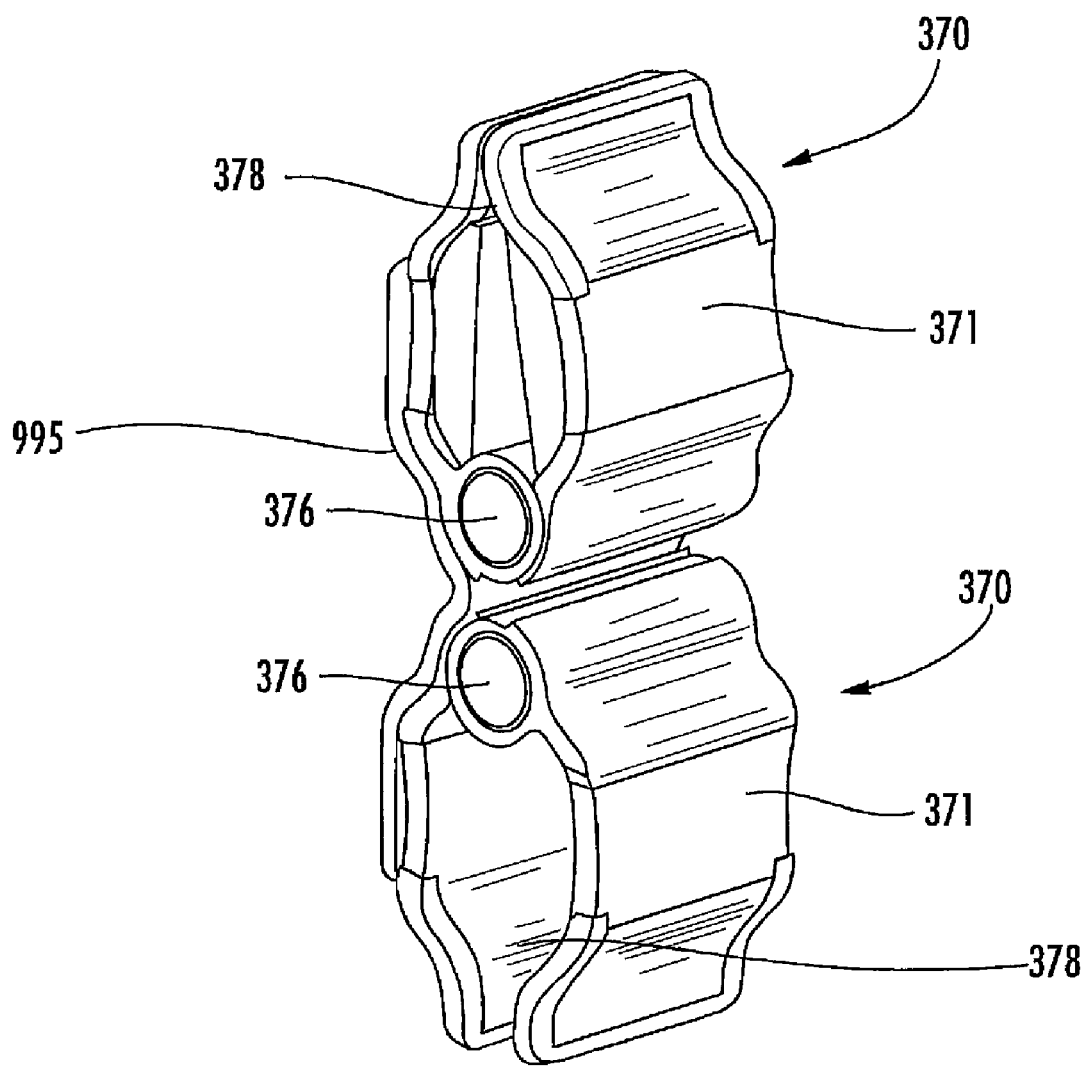
FIG. 26 is an isometric view of a utility clip with an IV holder and an attachment member in a closed position according to an embodiment of the present invention.
Figure 27:
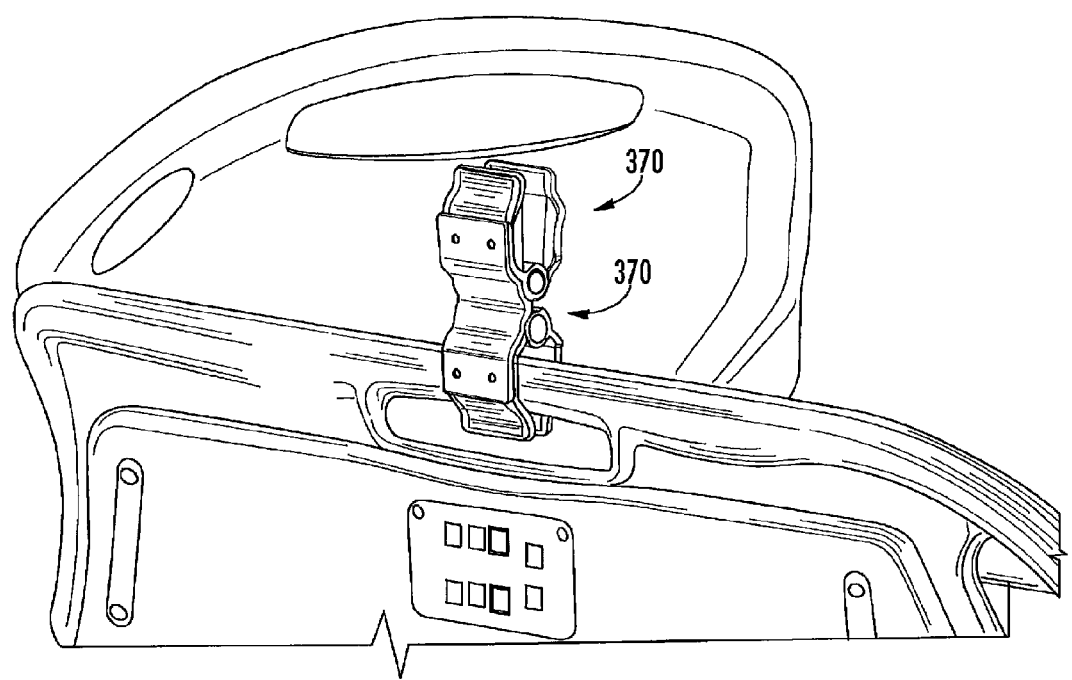
FIG. 27 is an isometric view of a utility clip with an IV holder and an attachment member secured to a siderail according to another embodiment of the present invention.
Figure 28:
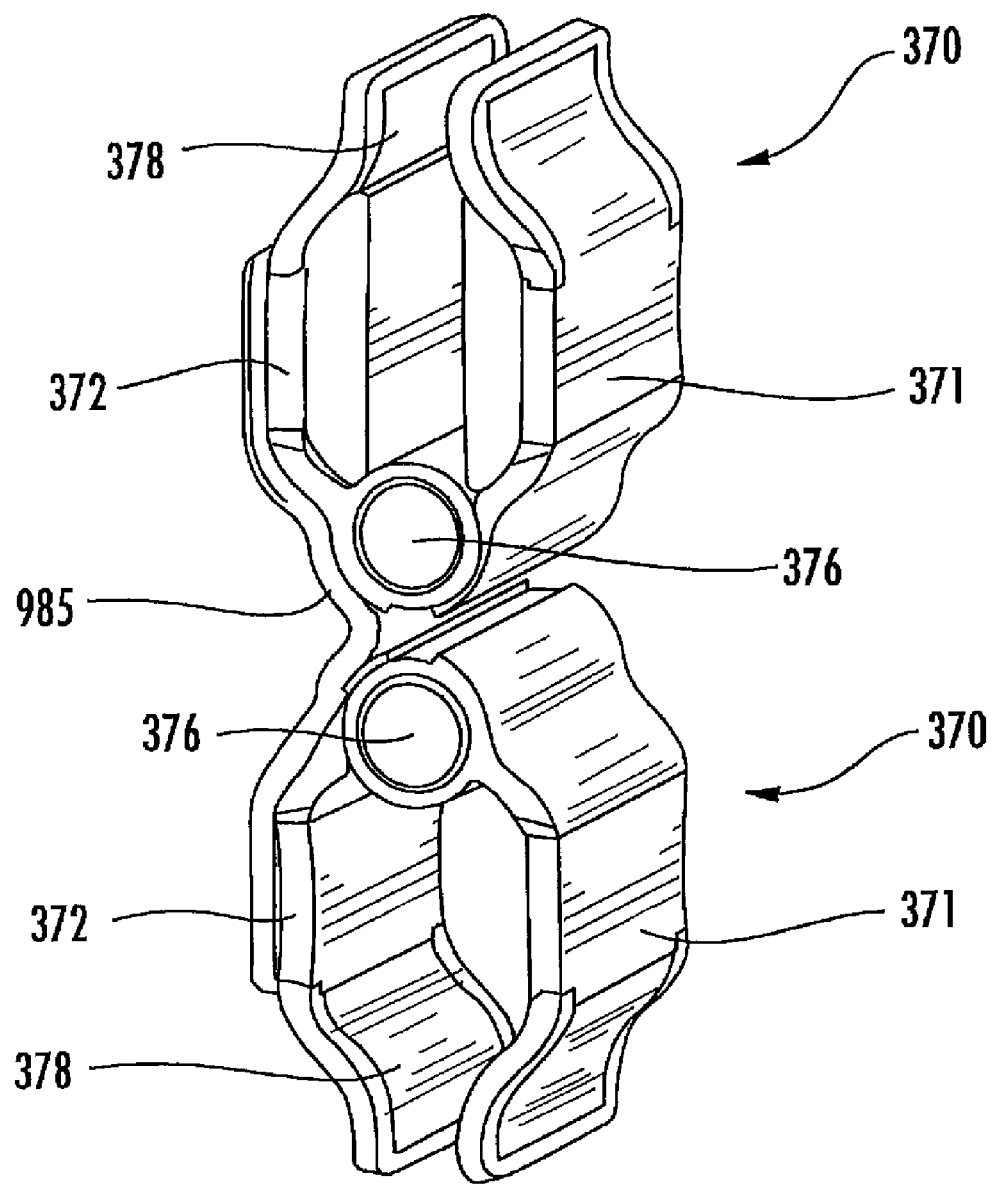
FIG. 28 is an isometric view of a utility clip with an IV holder and an attachment member in an opened position according to an embodiment of the present invention.

As best seen in FIGS. 22-24, two clips 370 may be coupled together by a bracket in the form of a plate 885 that has one set of openings for receiving bodies 370c of one clip and another set of openings to receive the bodies 370c of the other clip. Further, one or both clips may include pads 900 (FIG. 22) on the inwardly facing sides of the clip members (371, 372), which reduces the spacing between the clip members and, further, may provide a resilient high friction surface for holding therebetween tubes or the like. Pads 900 may be made from a similar material to pads 385f and 385g.

As best seen in FIGS. 25-28, clips 370 may be attached by a bracket 995 that provides a stacked arrangement for the clips with a first upper plate section 995a for mounting to one clip and a second lower plate section 995b for mounting to the second clip.

Figure 29:
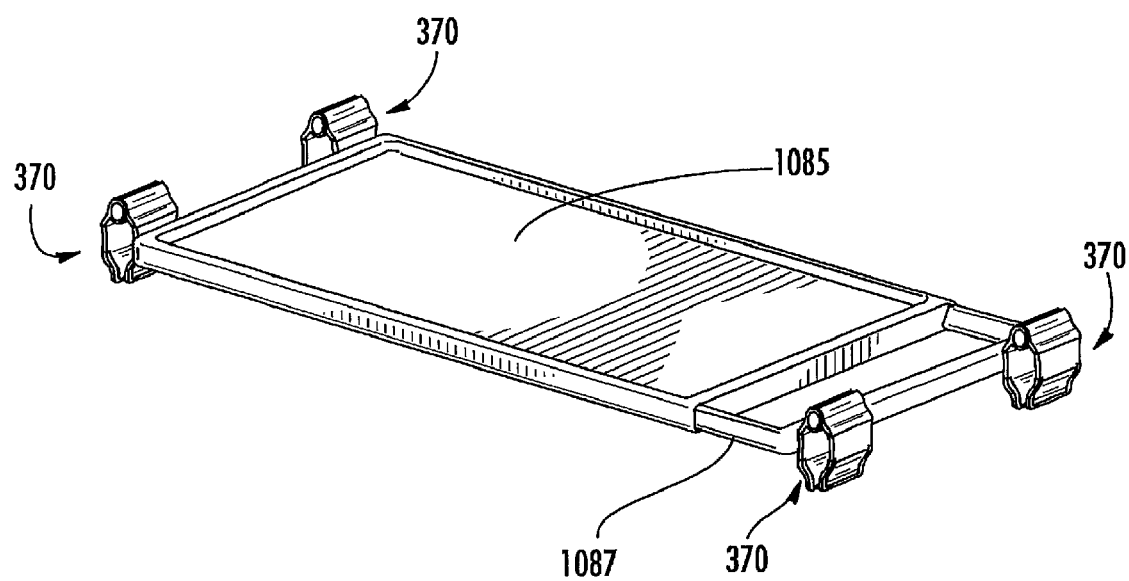
FIG. 29 is an isometric view of an over bed table with utility clips according to another embodiment of the present invention.
Figure 30:
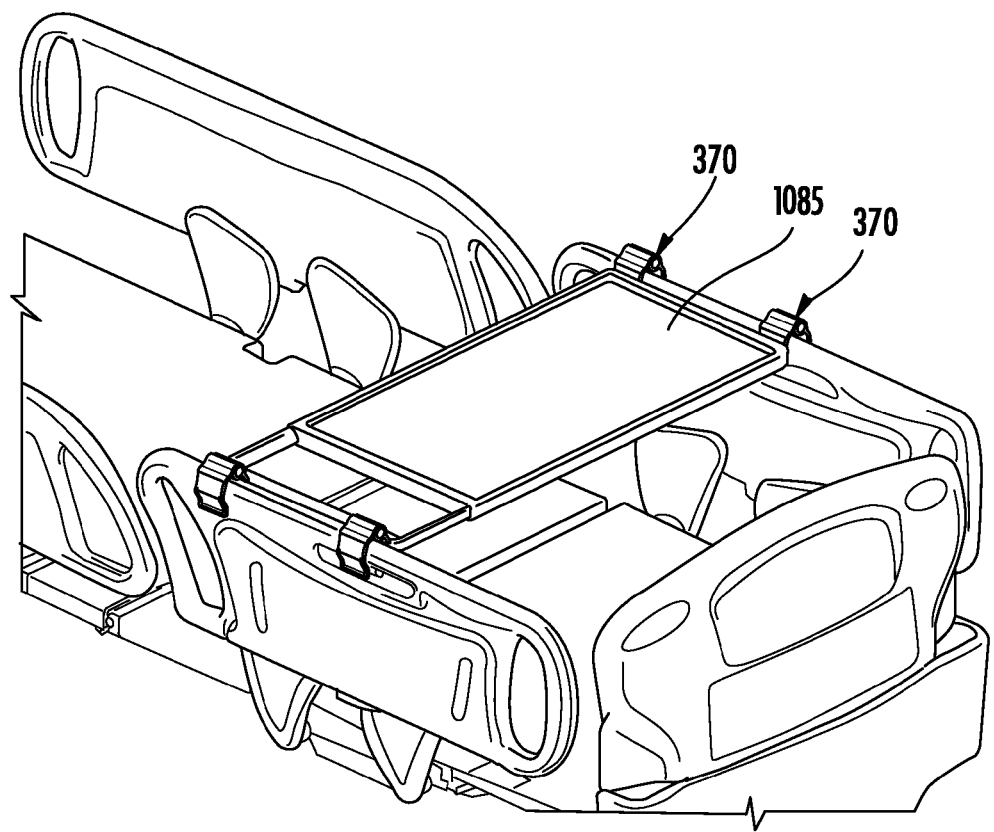
FIG. 30 is an isometric view of an over bed table with utility clips secured to siderails according to an embodiment of the present invention.

FIGS. 29-30 illustrate a transverse over bed table 1085 with utility clips 370 mounted to the frame members 1087 of table 1085. Frame members 1087 similarly includes openings into which bodies 370c may be secured or mounted.

Figure 31:
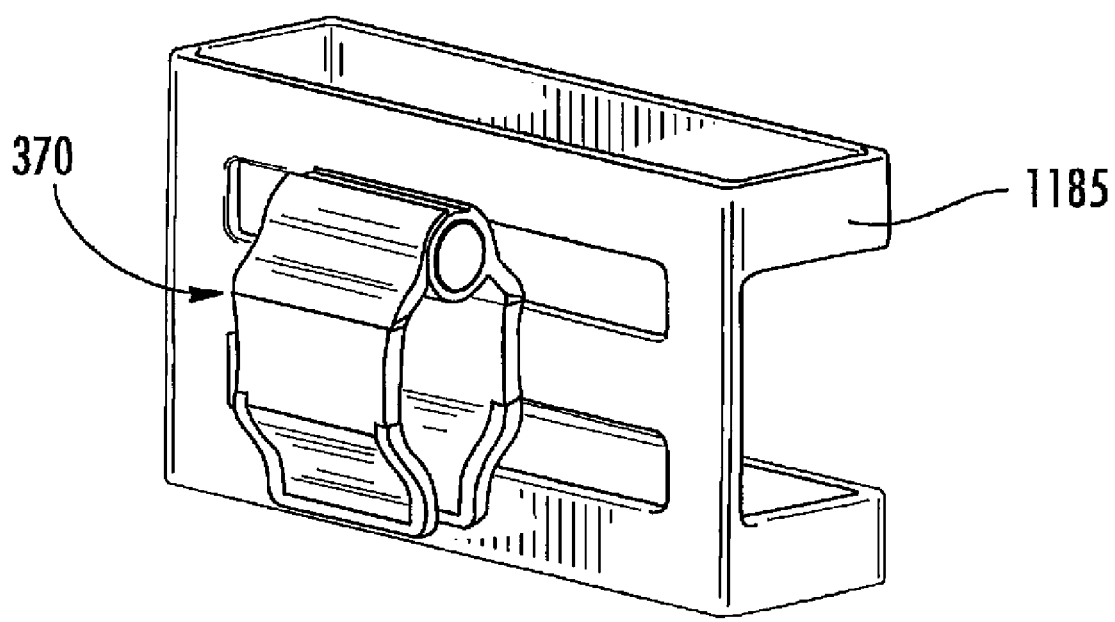
FIG. 31 is a back isometric view of a utility clip with a tissue holder according to an embodiment of the present invention.

FIG. 31 depicts a clip 370 with a tissue box holder 1185 mounted to the clip in a similar manner described in reference to the previous embodiments.

Figure 32:
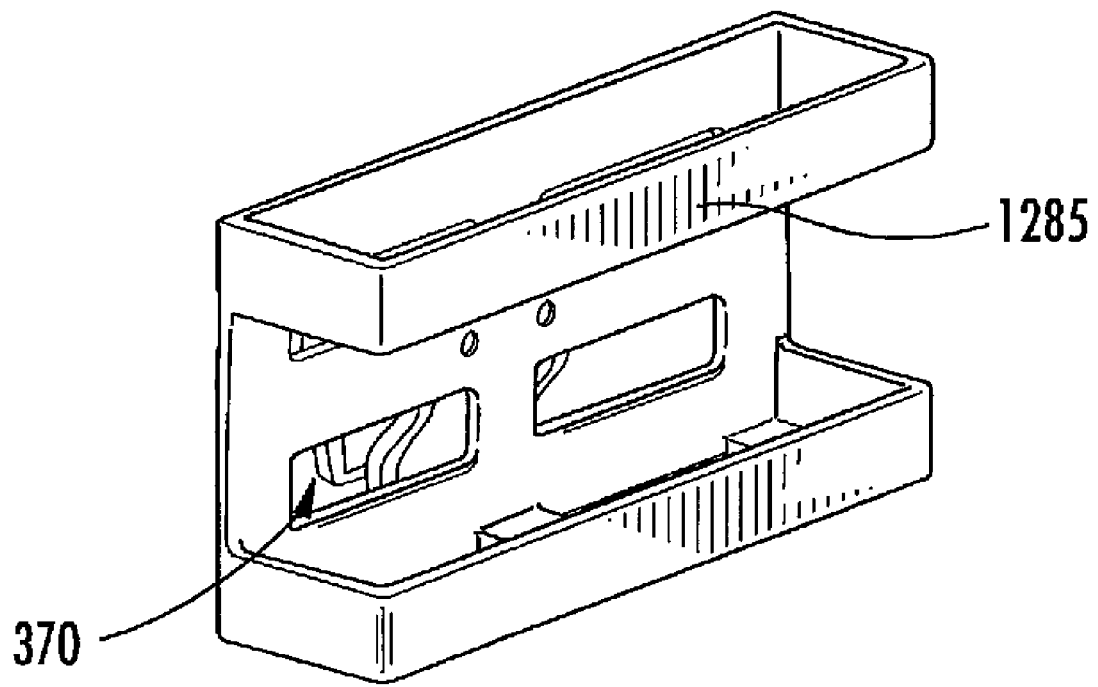
FIG. 32 is a front isometric view of a utility clip with a tissue holder according to an embodiment of the present invention.
Figure 33:
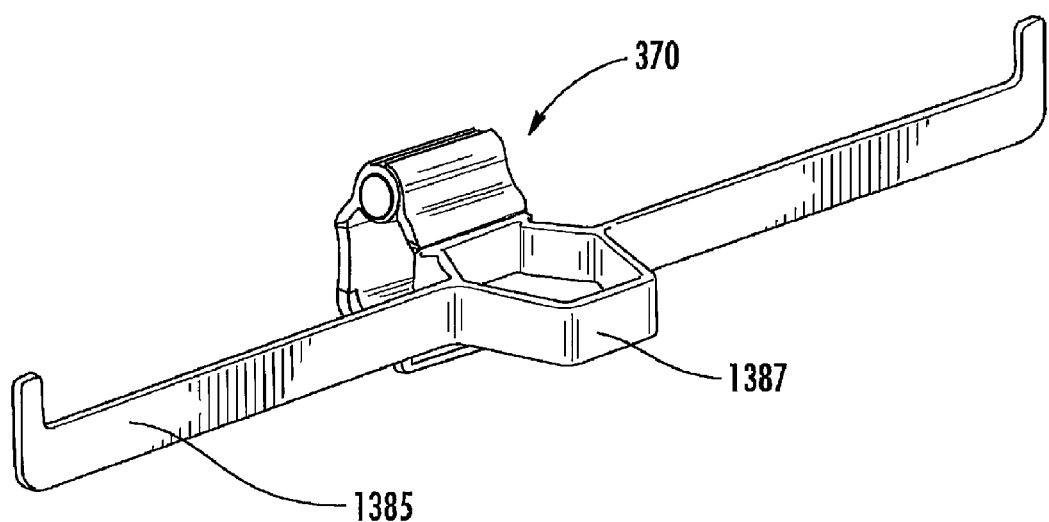
FIG. 33 is a front isometric view of a utility clip with a towel and soap holder according to an embodiment of the present invention.

FIGS. 32-33 illustrate a clip 370 with a soap holder 1285 or a towel holder 1385. Towel holder 1385 may optionally include a holder 1387 for holding personal hygiene products such as shampoo, conditioner, lotion, body gels, etc.

Figure 34:
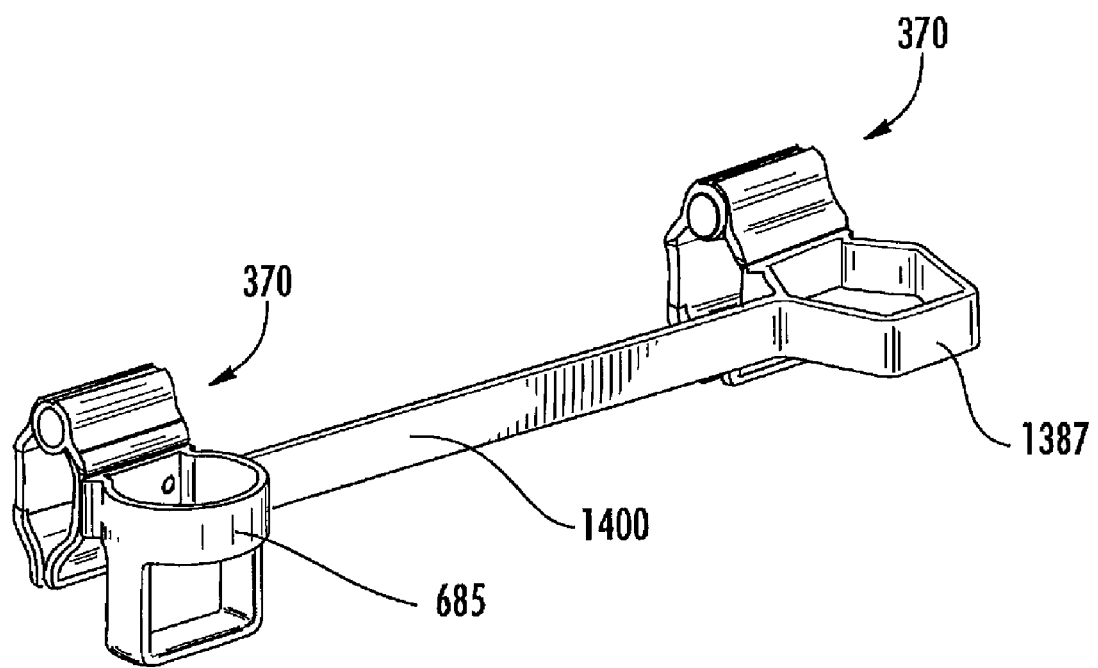
FIG. 34 is a front isometric view of a utility clip with a towel and soap holder according to another embodiment of the present invention.
Figure 35:
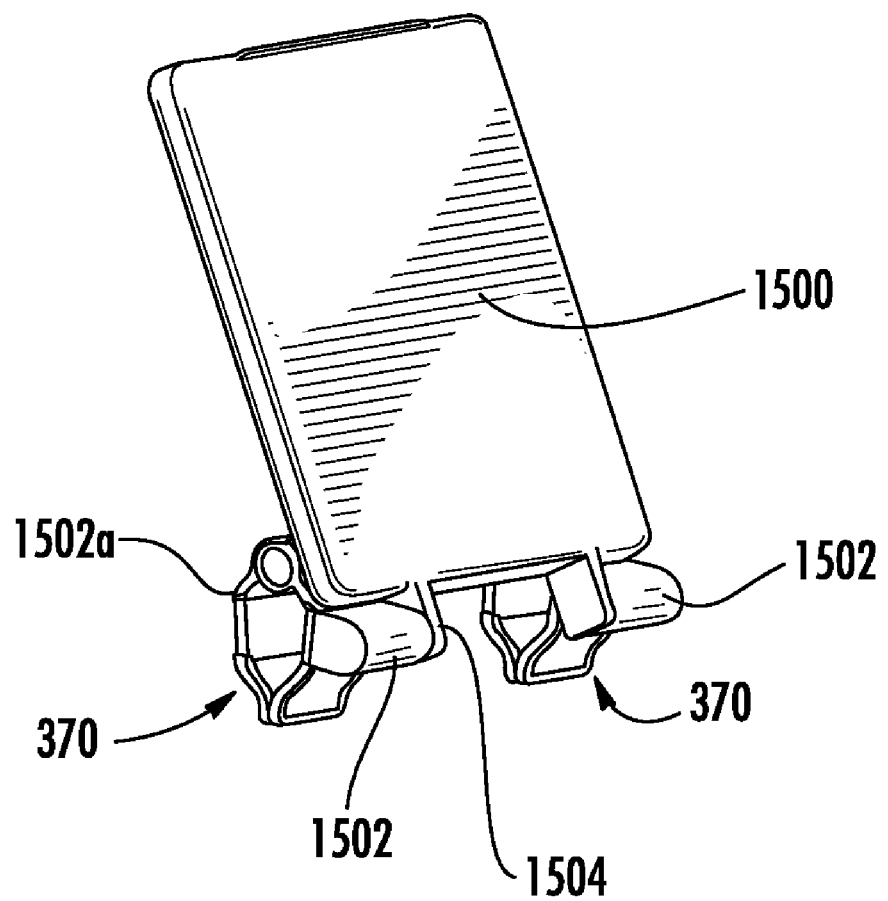
FIG. 35 is an isometric view of utility clips with a table according to another embodiment of the present invention.
Figure 36:
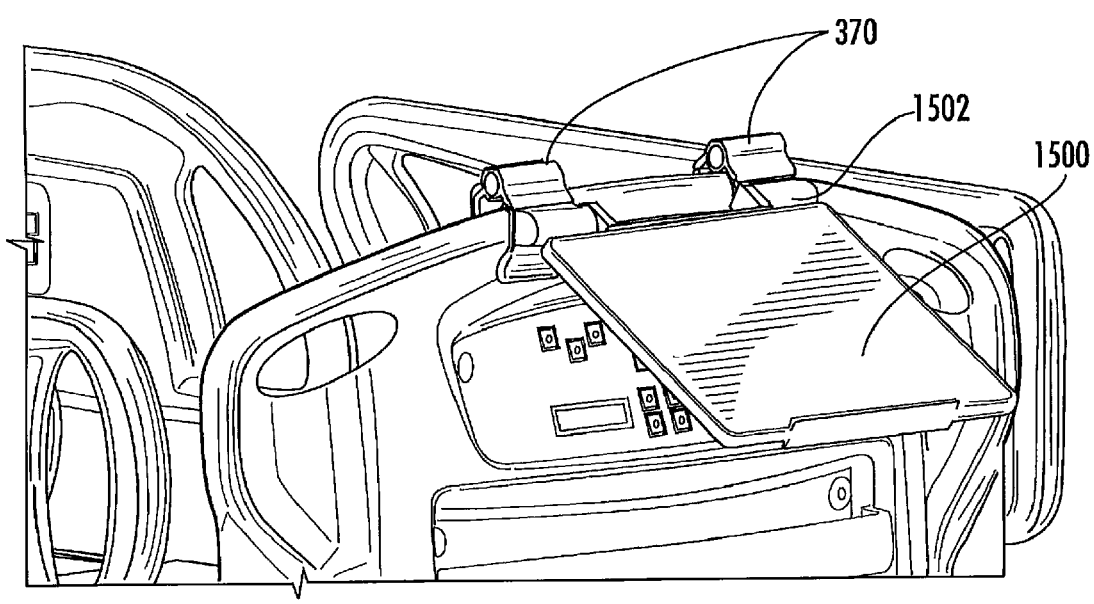
FIG. 36 is an isometric view of utility clips with a table in an angled position secured to a siderail according to another embodiment of the present invention.
Figure 37:
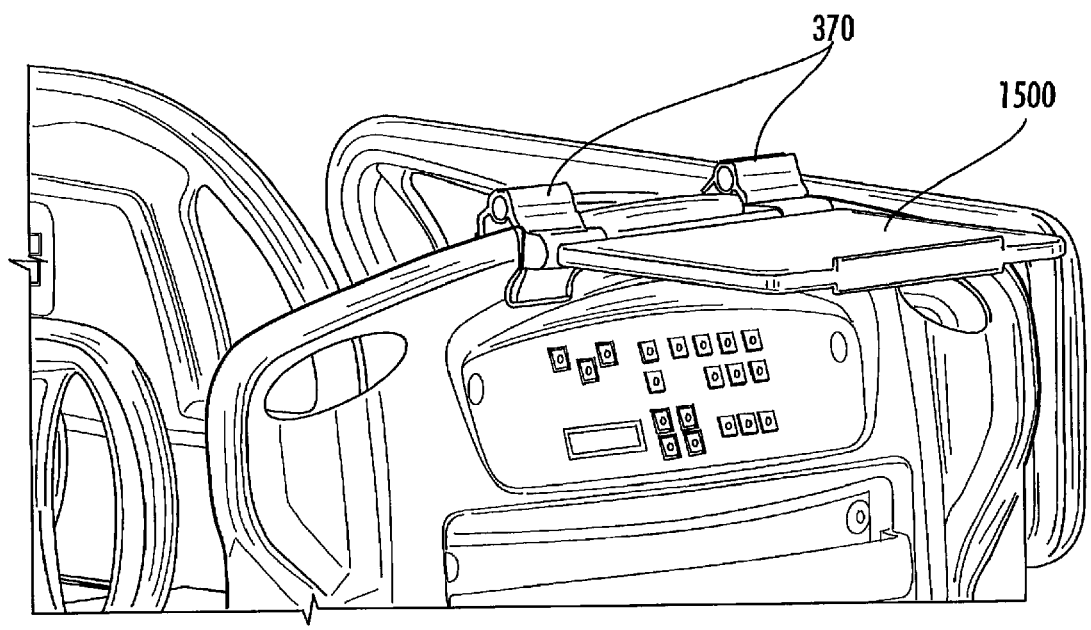
FIG. 37 is an isometric view of utility clips with a table in a horizontal position secured to a siderail according to an embodiment of the present invention.
Figure 38:
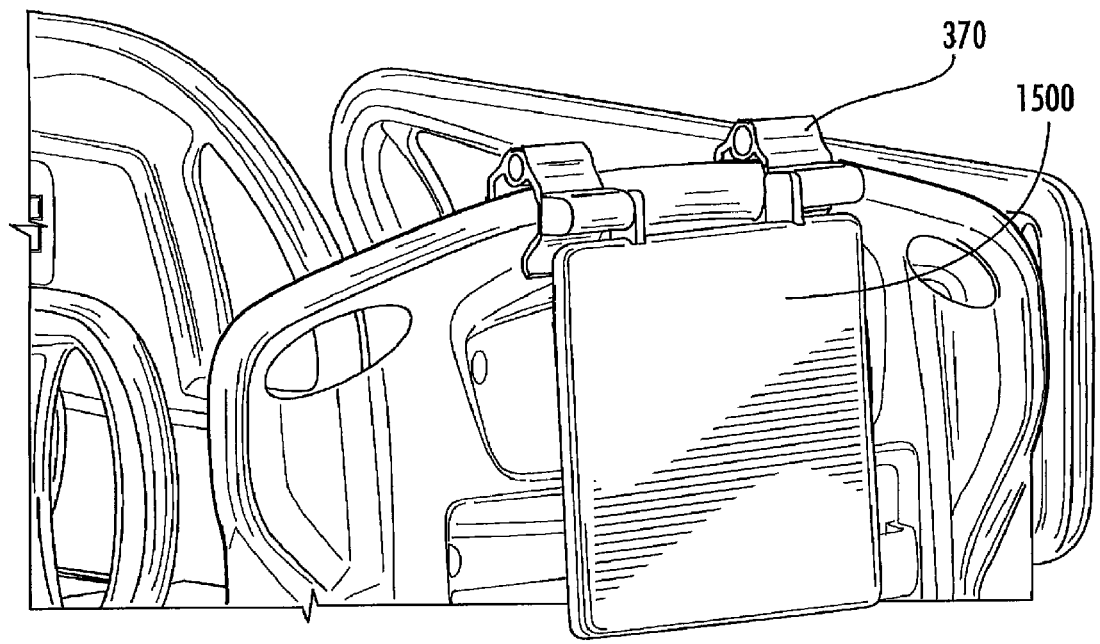
FIG. 38 is an isometric view of utility clips with a table in a vertical position secured to a siderail according to an embodiment of the present invention.
Figure 39:
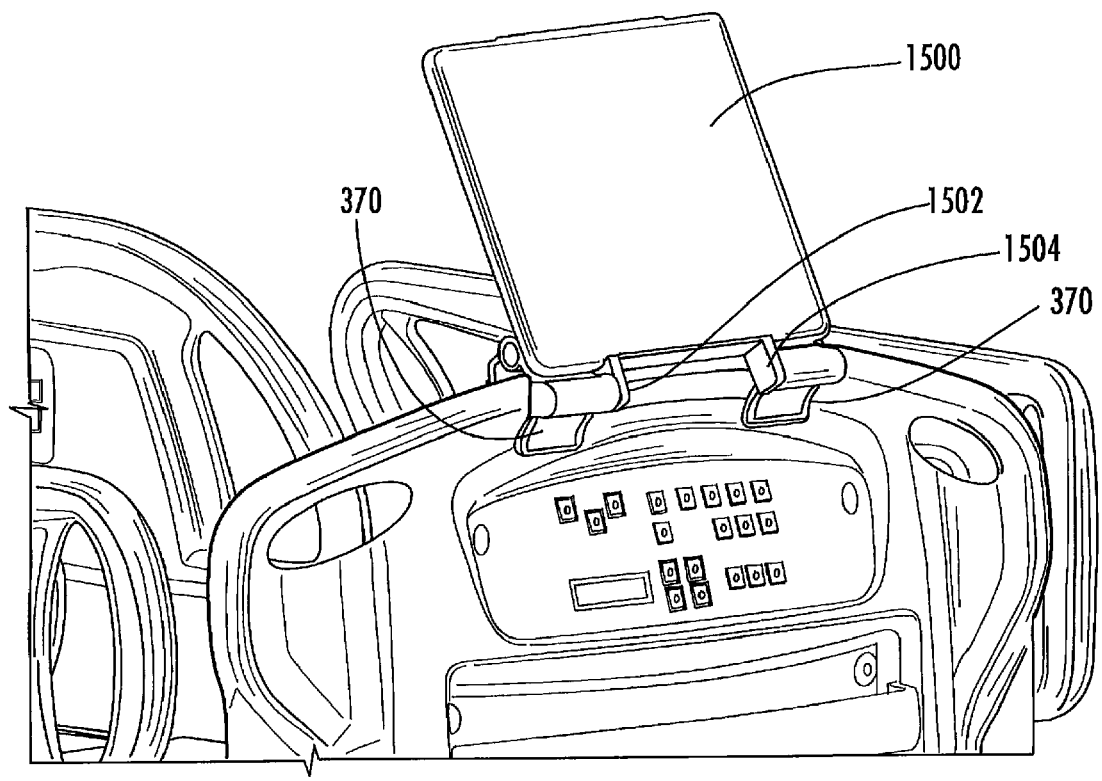
FIG. 39 is an isometric view of utility clips with a table in a raised position secured to a siderail according to an embodiment of the present invention.

FIG. 34 shows clips 370 and holders 685 and 1387 interconnected by a transverse member 1400.

Referring to FIGS. 35-39, according to another embodiment of the present invention clips 370 may be used to mount a writing surface, such as a writing table 1500, for example in a plurality of different positions. For example, writing table 1500 may be mounted to clips 370 by pivot brackets 1502, which allow for selective positioning of table 1500 about a generally horizontal axis of rotation 1502a. Table 1500 is mounted to brackets 1502 by a pair of tabs 1504 which extend from a lower edge (as viewed in FIG. 35) of table 1500 and couple to the pins (not shown) of brackets 1502. For example, the pins may be contained in a high friction sleeve so that brackets 1502 for example, may provide an infinite number of positions (similar to a lap top hinge) or the pins may have a plurality of engagement surfaces that cooperate with similar engagement surfaces provided on the inside wall of the bracket, such as flexible splines, to provide a plurality of discrete positions for table 1500.

Accordingly, the present invention provides a universal clip that can be used to mount a wide variety of accessories or objects to a structural member of, for example, hospital equipment and especially of a patient handling device.

While several embodiments have been shown and described, modifications and variations may be made without departing from the scope of the invention.

We claim:
1. Hospital equipment comprising:
a rail or frame member;
a clip mounting to said rail or frame member, said clip comprising:
a first clip member and a second clip member pivotally interconnected with said first clip member about a pivot axis, each of said clip members including a plate member and a respective hollow cylindrical body at a proximate portion of said plate member, each of said plate members having a transverse extent extending along said pivot axis and along said hollow cylindrical body of the other of said clip members, each of said first and second clip members having a receiving portion for receiving the frame or rail member;
a biasing spring urging said first clip member and said second clip member toward each other wherein when said first clip member and said second clip member straddle said frame or rail member and said frame or rail member is positioned in said receiving portions, and said biasing spring urging said first and second clip members to engage said frame or rail member with sufficient clamping force to fixedly support said clip at any pivotal orientation along said rail or frame member; and
an accessory mounting member configured for mounting an accessory to said clip, said accessory mounting member coupled to one of said clip members wherein said clip may be used for mounting an accessory to said member,
wherein said accessory mounting member includes a fastener, said fastener for mounting an accessory to said accessory mounting member, wherein said fastener includes a base portion mounted to said accessory mounting member and a pivotal arm pivotally mounted to said base portion.

2. The hospital equipment according to claim 1, wherein said rail or frame member comprises a member selected from a side rail, a footboard, and a headboard.

3. The hospital equipment according to claim 1, wherein each of said clip members includes a distal end offset from said receiving portion, said biasing spring further urging said distal ends to abut and contact each other whereby said clip resists rotational movement about an axis transverse to said pivot axis.

4. The hospital equipment according to claim 1, wherein each of said clip members includes an inwardly facing side, at least one of said inwardly facing sides having a high friction surface.

5. A clip for mounting to a member of hospital equipment, said clip comprising:
a first clip member and a second clip member pivotally interconnected with said first clip member about a pivot axis, each of said clip members including a plate member and a hollow cylindrical body at a proximate portion of said plate member, said hollow cylindrical bodies being aligned and receiving therein a pivot pin to thereby form a hinge, each of said plate members having a transverse extent extending along said pivot axis whereby said plate member of said first clip member at least partially wraps around said hollow cylindrical body of said second clip member and said plate member of said second clip member at least partially wraps around said hollow cylindrical body of said first clip member, a receiving portion for receiving the member of hospital equipment, and a distal edge portion extending along said transverse extent offset from said receiving portion;
a biasing spring urging said first clip member and said second clip member toward each other, wherein when said first clip member and said second clip member straddle the member of hospital equipment and when the member of hospital equipment is positioned in said receiving portions said biasing spring urges said first and second clip members to engage the member of hospital equipment;
an accessory mounting member mounted to one of said clip members, and said accessory mounting member configured for mounting an accessory to said clip; and
wherein said clip member lacks any fastener for urging said first clip member and said second clip member toward each other.

6. The clip according to claim 5, wherein said accessory mounting member comprises a fastener for securing an accessory to said clip.

7. The clip according to claim 6, wherein said fastener includes a pivotal arm pivotally mounted at said accessory mounting member, said arm moveable between an open position for receiving an accessory and a closed position wherein the accessory is secured to said clip by said fastener.

8. The clip according to claim 6, wherein said fastener includes a plurality of clamps, each of said clamps being adapted to engage and releasably secure a tube or a wire to said clip.

9. The clip according to claim 5, wherein said accessory mounting member comprises a receptacle.

10. The clip according to claim 5, wherein said clip comprises a first clip, and said accessory mounting member being adapted to couple a second clip to said first clip.

11. The clip according to claim 5, wherein when said first clip member and said second clip member straddle the member and when the member is positioned in said receiving portions said biasing spring further urges said distal edge portions of said plate members to abut and contact each other whereby said clip has increased rotational resistance transverse to said pivot axis.

12. The clip according to claim 5, in combination with a shelf, said shelf including a frame member, said frame member coupled to said one of said clip members and forming said accessory mounting member.

13. The clip according to claim 5, wherein said biasing spring alone provides sufficient clamping force to said clip members whereby said clip resists rotational movement about an axis transverse to said pivot axis via frictional engagement of said first and second clip members with the member of hospital equipment.

14. The clip according to claim 5, further in combination with a hospital bed.

15. Hospital equipment comprising:
a rail or frame member;
a clip mounting to said rail or frame member, said clip comprising:
a first clip member and a second clip member pivotally interconnected with said first clip member about a pivot axis, each of said clip members including a plate member and a respective hollow cylindrical body at a proximate portion of said plate member, each of said plate members having a transverse extent extending along said pivot axis and along said hollow cylindrical body of the other of said clip members, each of said first and second clip members having a receiving portion for receiving the frame or rail member;
a biasing spring urging said first clip member and said second clip member toward each other wherein when said first clip member and said second clip member straddle said frame or rail member and said frame or rail member is positioned in said receiving portions, and said biasing spring urging said first and second clip members to engage said frame or rail member with sufficient clamping force to fixedly support said clip at any pivotal orientation along said rail or frame member; and
an accessory mounting member configured for mounting an accessory to said clip, said accessory mounting member coupled to one of said clip members wherein said clip may be used for mounting an accessory to said rail or frame member,
wherein each of said clip members includes an inwardly facing side, at least one of said inwardly facing sides having a high friction surface,
wherein each of said hollow cylindrical bodies are adjacent and aligned along said pivot axis and configured to support a pivot pin therein.

16. The hospital equipment according to claim 15, wherein said accessory mounting member includes a pair of receiving grooves for mounting an accessory to said accessory mounting member.

17. The hospital equipment according to claim 16, wherein said mounting member comprises a plate with opposed edges, said receiving grooves located inward of said opposed edges.

18. The hospital equipment according to claim 15, wherein said accessory mounting member includes a fastener, said fastener for mounting an accessory to said accessory mounting member.

19. The hospital equipment according to claim 18, wherein said fastener includes a clamp for securing at least one tube or at least one wire to said accessory mounting member.

20. The hospital equipment according to claim 19, wherein said fastener includes a plurality of clamps.

21. The hospital equipment according to claim 15, wherein said accessory mounting member includes a receptacle.

22. The hospital equipment according to claim 21, wherein said receptacle is configured for holding or engaging a cylindrical object.

23. The hospital equipment according to claim 15, wherein said clip comprises a first clip, said accessory mounting member being configured to mount a second clip to said first clip.

24. The hospital equipment according to claim 23, wherein said second clip comprises:
  a first clip member and a second clip member pivotally interconnected with said first clip member about a pivot axis, each of said first and second clip members of said second clip having a receiving portion for receiving an accessory; and
  a biasing member urging said first and second clip members of said second clip toward each other wherein when said first clip member and said second clip member straddle said accessory and said accessory is positioned in said receiving portions of said second clip member, said biasing member urges said first and second clip members of said second clip to engage said accessory.

25. The hospital equipment according to claim 24, wherein said second clip includes a foam member at least one of said receiving portions wherein said second clip may be used to grip one or more tubes.

26. The hospital equipment according to claim 15, at least one clip member of said clip members includes a gripping area at least at said receiving portion of said at least one clip member.

27. The hospital equipment according to claim 15, wherein said hollow cylindrical bodies further support said biasing spring therein about said pivot pin, said biasing spring urging distal ends of said clip members towards each other.

28. Hospital equipment comprising:
a rail or frame member;
a clip mounting to said rail or frame member, said clip comprising:
  a first clip member and a second clip member pivotally interconnected with said first clip member about a pivot axis, each of said first and second clip members having a pivot shaft and a receiving portion, each of said receiving portions including a high-friction gripping area for receiving and frictionally engaging the frame or rail member, each of said pivot shafts being adjacent and aligned along said pivot axis, and said first and second clip members are arranged symmetrically on opposite sides of said pivot axis;
  a pivot pin substantially enclosed in said pivot shafts of said first and second clip members along said pivot axis for pivotally coupling said first clip member to said second clip member;
  a biasing spring urging said first clip member and said second clip member toward each other about said pivot pin wherein when said first clip member and said second clip member straddle said frame or rail member and said frame or rail member is positioned in said receiving portions, and said biasing spring urging said first and second clip members to engage said frame or rail member with sufficient clamping force to support said clip at said rail or frame member; and
  an accessory mounting member configured for mounting an accessory to said clip, said accessory mounting member coupled to one of said clip members wherein said clip may be used for mounting an accessory to said rail or frame member.

29. The hospital equipment according to claim 28, wherein said gripping areas comprise rubber pads.

30. The hospital equipment according to claim 28, wherein said rail or frame member comprises a member selected from a side rail, a footboard, and a headboard.

* * * * *